(12) United States Patent
Miyamoto et al.

(10) Patent No.: US 10,809,227 B2
(45) Date of Patent: Oct. 20, 2020

(54) CONCENTRATION COMPUTATION APPARATUS

(71) Applicant: NGK Spark Plug Co., LTD., Nagoya (JP)

(72) Inventors: Shinya Miyamoto, Niwa-gun (JP); Yoshihiro Nakano, Komaki (JP)

(73) Assignee: NGK Spark Plug Co., LTD., Nagoya (JP)

( * ) Notice: Subject to any disclaimer, the term of this patent is extended or adjusted under 35 U.S.C. 154(b) by 175 days.

(21) Appl. No.: 16/024,095

(22) Filed: Jun. 29, 2018

(65) Prior Publication Data

US 2019/0011395 A1 Jan. 10, 2019

(30) Foreign Application Priority Data

Jul. 7, 2017 (JP) .................. 2017-133768

(51) Int. Cl.
*G01N 27/417* (2006.01)
*G01N 27/406* (2006.01)
*G01N 27/41* (2006.01)
*G01N 27/407* (2006.01)

(52) U.S. Cl.
CPC ....... *G01N 27/417* (2013.01); *G01N 27/4065* (2013.01); *G01N 27/4071* (2013.01); *G01N 27/4074* (2013.01); *G01N 27/41* (2013.01)

(58) Field of Classification Search
CPC ............. G01N 27/417; G01N 27/4065; G01N 27/4074; G01N 27/4071; G01N 27/406–41; G01N 33/0004–0075
See application file for complete search history.

(56) References Cited

U.S. PATENT DOCUMENTS

| 2011/0048970 A1* | 3/2011 | Sugaya | ................ G01N 27/419 205/781 |
| 2012/0145543 A1* | 6/2012 | Sugaya | .............. G01N 27/4074 204/424 |
| 2016/0082390 A1* | 3/2016 | Nakano | .............. B01D 53/9431 700/271 |

FOREIGN PATENT DOCUMENTS

JP 2016-065862 A 4/2016

* cited by examiner

*Primary Examiner* — Maris R Kessel
*Assistant Examiner* — Joshua L Allen
(74) *Attorney, Agent, or Firm* — Leason Ellis LLP

(57) ABSTRACT

A microcomputer calculates the concentration of ammonia contained in exhaust gas. The microcomputer repeatedly obtains from a first ammonia detection section a first ammonia electromotive force EMF1 whose value changes with both the concentrations of ammonia and a flammable gas contained in the exhaust gas. The microcomputer outputs, as ammonia concentration information at the present point in time, ammonia concentration information representing the ammonia concentration at the point 0.5 sec prior to the present point in time. The microcomputer sets a rich spike flag Fs when a first ammonia electromotive force change amount $\Delta EMF1$ is smaller than a value obtained by multiplying a start determination value by −1. When the rich spike flag Fs is set, the microcomputer sets the ammonia concentration information at the present point in time to the value of the ammonia concentration information at the point immediately before the rich spike flag Fs is set.

4 Claims, 10 Drawing Sheets

CONCENTRATION COMPUTATION APPARATUS

This application claims the benefit of Japanese Patent Application No. 2017-133768, filed Jul. 7, 2017, which is incorporated herein by reference in its entirety.

FIELD OF THE INVENTION

The present disclosure relates to a concentration computation apparatus for computing the concentration of ammonia.

BACKGROUND OF THE INVENTION

As disclosed in Japanese Unexamined Publication No. 2016-65862, there has been known a technique of determining that a rich spike has occurred when the concentration of oxygen contained in exhaust gas decreases sharply.

Problems to be Solved by the Invention

However, even in the case where no rich spike has occurred, in some cases, the technique disclosed in Japanese Unexamined Publication No. 2016-65862 may determine that a rich spike has occurred when the concentration of oxygen gas decreases sharply.

It is an object of the present disclosure to improve the accuracy in detecting the rich spike.

SUMMARY OF THE INVENTION

Means for Solving the Problems

One mode of the present disclosure provides a concentration computation apparatus which computes the concentration of ammonia contained in a gas under measurement (target gas) and which comprises a storage section, a concentration output section, a flammable gas determination section, and an information setting section.

The storage section is configured to repeatedly obtain an ammonia electromotive force which is output from an ammonia detection section and whose value changes with both the concentration of ammonia contained in the gas under measurement and the concentration of a flammable gas contained in the gas under measurement and to store ammonia electromotive force information representing the obtained ammonia electromotive force.

The concentration output section is configured to use the ammonia electromotive force information stored in the storage section to output delayed ammonia concentration information as current ammonia concentration information, said delayed ammonia concentration information representing the ammonia concentration at a point prior to the present point in time by a preset delay time.

The flammable gas determination section is configured to determine that the flammable gas is contained in the gas under measurement in the case where an amount of decrease in the ammonia electromotive force in a decreased time interval set to be shorter than the delay time is larger than a start determination value set in advance.

The information setting section is configured to set the current ammonia concentration information using a value of the delayed ammonia concentration information, wherein when the flammable gas determination section determines that the flammable gas is contained in the gas under measurement, the information setting section sets the value of the delayed ammonia concentration information observed immediately before the determination by the flammable gas determination section as the current ammonia concentration information.

As described above, the concentration computation apparatus of the present disclosure determines whether or not the flammable gas is contained in the gas under measurement on the basis of the ammonia electromotive force whose value changes not only with the concentration of ammonia but also with the concentration of the flammable gas. When a rich spike is generated, the concentration of the flammable gas contained in the gas under measurement increases sharply. In view of this, the concentration computation apparatus of the present disclosure determines that the flammable gas is contained in the gas under measurement in the case where the amount of decrease in the ammonia electromotive force in the decreased time interval is greater than the start determination value. Namely, the concentration computation apparatus of the present disclosure can detect a rich spike in which the flammable gas concentration increases sharply. Therefore, the concentration computation apparatus of the present disclosure can detect such a rich spike on the basis of the flammable gas concentration rather than the oxygen concentration, thereby improving the accuracy in detecting the rich spike.

Also, the concentration computation apparatus of the present disclosure outputs, as current ammonia concentration information, the delayed ammonia concentration information representing the ammonia concentration at a point prior to the present point in time by the delay time. In the case where the concentration computation apparatus of the present disclosure determines that the flammable gas is contained in the gas under measurement, the concentration computation apparatus sets the current ammonia concentration information to the value of the delayed ammonia concentration information immediately before the concentration computation apparatus determines that the flammable gas is contained in the gas under measurement. As a result, the concentration computation apparatus of the present disclosure can prevent occurrence of a situation where, due to an increase in the flammable gas concentration caused by the generation of a rich spike, the value of the delayed ammonia concentration information increases despite no change occurring in the ammonia concentration. Thus, the concentration computation apparatus of the present disclosure can prevent a deterioration in the accuracy in detecting the ammonia concentration.

In the one mode of the present disclosure, an electromotive force end determination section may be provided, and electromotive force end conditions may include at least one condition in which an amount of increase in the ammonia electromotive force in an ammonia increase time interval set in advance is larger than an ammonia end determination value set in advance.

The electromotive force end determination section is configured to determine whether or not electromotive force end conditions are satisfied, the electromotive force end conditions being set in advance through use of the ammonia electromotive force so as to determine that the flammable gas is not contained in the gas under measurement, and to determine that the flammable gas is not contained in the gas under measurement when the electromotive force end conditions are satisfied.

In this case, the concentration computation apparatus of the present disclosure can determine whether or not a rich spike has ended on the basis of the characteristics of the rich spike that the rich spike ends after the flammable gas concentration decreases sharply after having increased sharply. Thus, the concentration computation apparatus of the present disclosure can accurately determine the end of the rich spike.

In the one mode of the present disclosure, an oxygen concentration computation section and an oxygen end determination section may be provided, and oxygen end conditions may include at least one condition in which an amount of increase in the calculated oxygen concentration in an oxygen increase time interval set in advance is larger than an oxygen end determination value set in advance.

The oxygen concentration computation section is configured to repeatedly obtain an oxygen concentration signal which is output from an oxygen detection section and whose value changes with the concentration of oxygen contained in the gas under measurement and to compute, as a calculated oxygen concentration, the concentration contained in the gas under measurement on the basis of the obtained oxygen concentration signal.

The oxygen end determination section is configured to determine whether or not oxygen end conditions are satisfied, the oxygen end conditions being set in advance through use of the calculated oxygen concentration so as to determine that the flammable gas is not contained in the gas under measurement, and to determine that the flammable gas is not contained in the gas under measurement when the oxygen end conditions are satisfied.

In this case, the concentration computation apparatus of the present disclosure can determine whether or not a rich spike has ended on the basis of the characteristics of the rich spike that the rich spike ends after the oxygen concentration increases sharply. Thus, the concentration computation apparatus of the present disclosure can accurately determine the end of the rich spike.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

First Embodiment

A first embodiment of the present disclosure will be described with reference to the drawings.

A multi-gas detection apparatus of the present embodiment is used for a system which is mounted on a vehicle and in which an SCR (selective catalytic reduction) catalyst for cleaning nitrogen oxide contained in exhaust gas discharged from an internal combustion engine is disposed and urea is supplied to the SCR catalyst as a reducing agent. The system includes an NOx storage reduction catalyst, a diesel oxidation catalyst (DOC), and/or a diesel particulate filter (DPF), and a so-called rich spike is performed for cleaning these catalysts. More specifically, the multi-gas detection apparatus detects the concentrations of ammonia, nitrogen dioxide, and nitrogen oxide contained in the exhaust gas on the downstream side of the NOx storage reduction catalyst or the SCR catalyst. The vehicle on which the multi-gas detection apparatus is mounted is referred to as the "own vehicle." Ammonia, nitrogen dioxide, and nitrogen oxide are denoted as $NH_3$, $NO_2$, and NOx, respectively.

Figure 1:
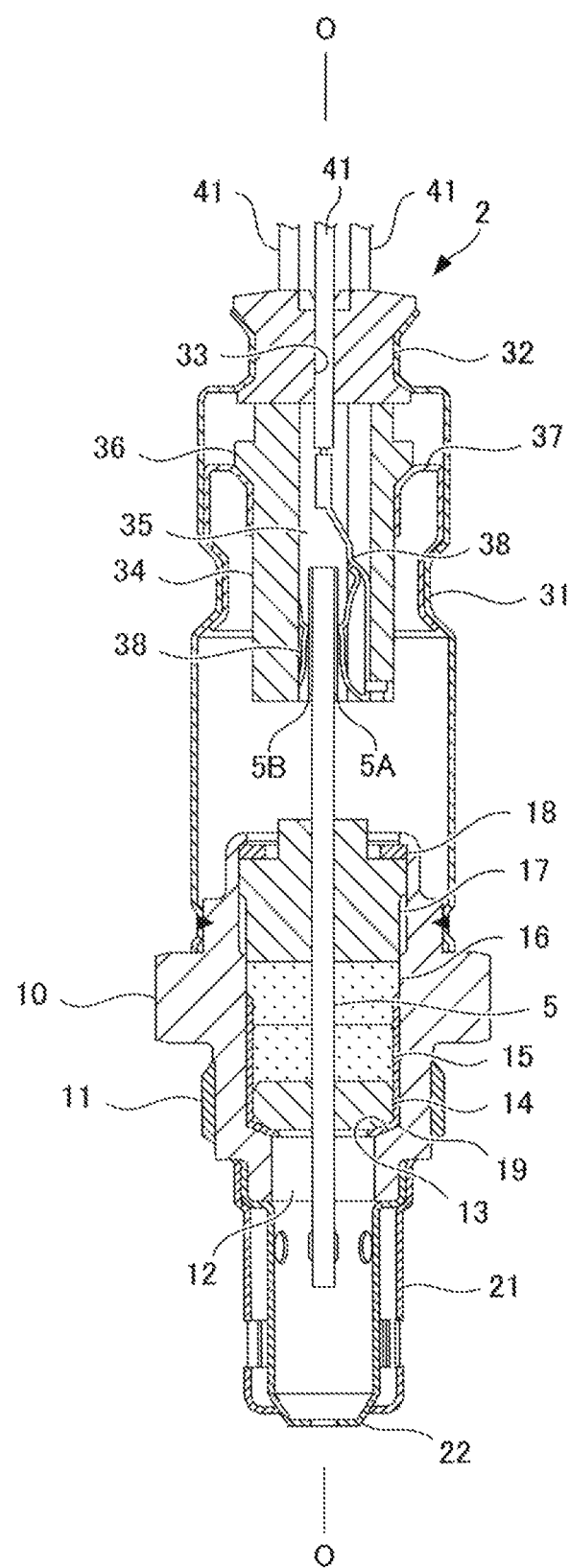
FIG. 1 is a cross-sectional view showing the internal structure of a multi-gas sensor 2.
Figure 2:
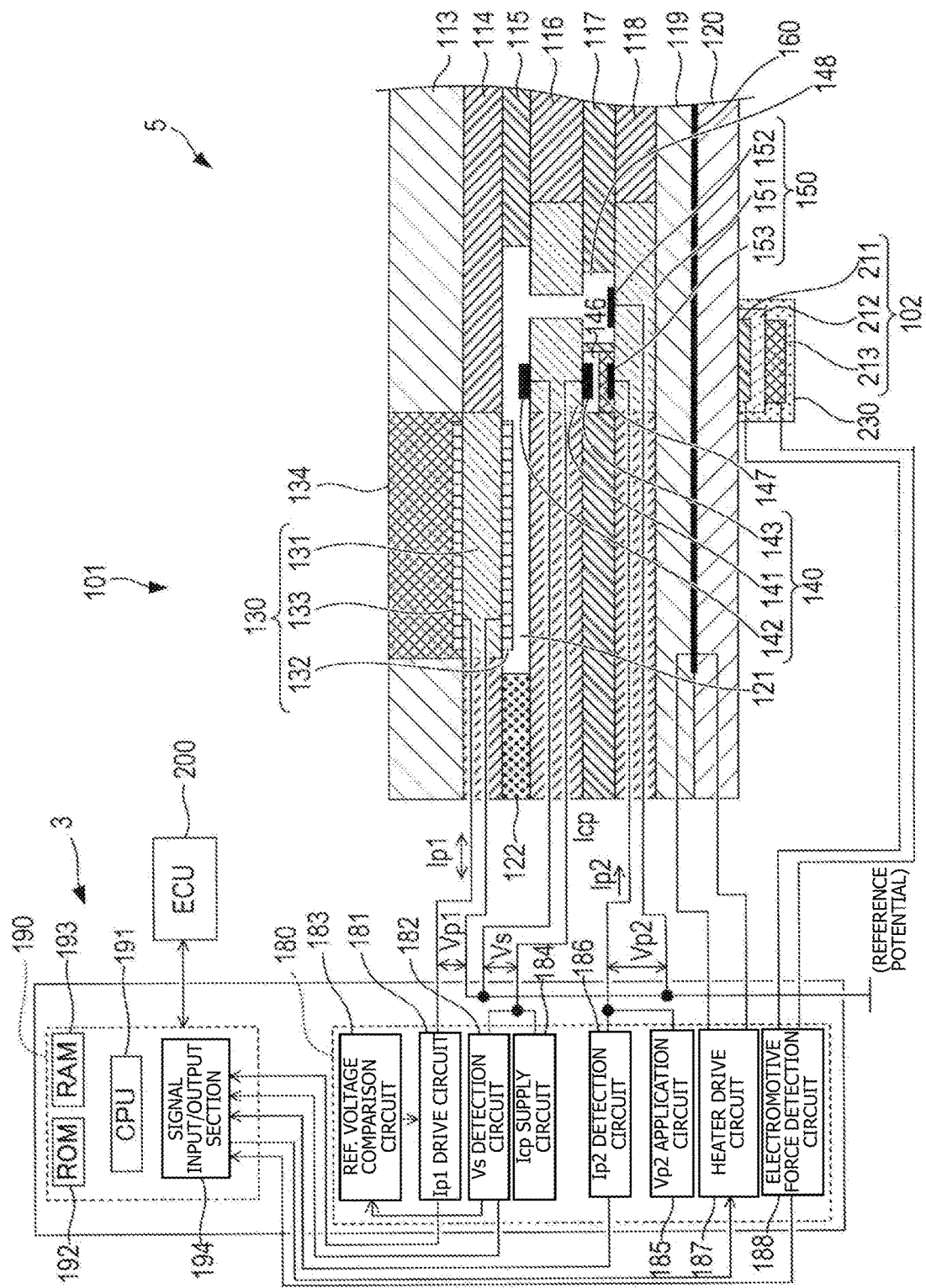
FIG. 2 is an illustration showing the schematic structures of a sensor element section 5 and a control section 3.

The multi-gas detection apparatus includes a multi-gas sensor 2 shown in FIG. 1 and a control section 3 shown in FIG. 2.

As shown in FIG. 1, the multi-gas sensor 2 includes a sensor element section 5, a metallic shell 10, a separator 34, and connection terminals 38. In the following description, the side of the multi-gas sensor 2 on which the sensor element section 5 is disposed (i.e., the lower side in FIG. 1) is referred to as a forward end side, and the side on which the connection terminals 38 are disposed (i.e., the upper side in FIG. 1) is referred to as a rear end side.

The sensor element section 5 has a plate shape extending in the direction of an axial line O. Electrode terminal portions 5A and 5B are disposed at the rear end of the sensor element section 5. In FIG. 1, only the electrode terminal portions 5A and 5B are shown as electrode terminal portions formed in the sensor element section 5 for the purpose of simplifying the drawing. However, in actuality, a plurality of electrode terminal portions are formed according to the number of, for example, electrodes included in an NOx detection section 101, a first ammonia detection section 102, and a second ammonia detection section 103 described later.

The metallic shell 10 is a tubular member, and a threaded portion 11 used to fix the multi-gas sensor 2 to an exhaust pipe of an internal combustion engine is formed on the external surface of the metallic shell 10. The metallic shell 10 has a through hole 12 extending in the direction of the axial line O and a ledge 13 protruding inward in the radial direction of the through hole 12. The ledge 13 is formed as an inward tapered surface extending from the radially outer side of the through hole 12 toward its center and inclined toward the forward end side.

The metallic shell 10 holds the sensor element section 5 such that a forward end portion of the sensor element section 5 protrudes forward from the through hole 12 and a rear end portion of the sensor element section 5 protrudes rearward from the through hole 12.

A ceramic holder 14 that is a tubular member surrounding the radial circumference of the sensor element section 5, talc rings 15 and 16 that are layers of charged talc powder, and a ceramic sleeve 17 are stacked in this order inside the through hole 12 of the metallic shell 10 from the forward end side toward the rear end side.

A crimp packing 18 is disposed between the ceramic sleeve 17 and a rear end portion of the metallic shell 10. A metallic holder 19 is disposed between the ceramic holder 14 and the ledge 13 of the metallic shell 10. The talc ring 15 and the ceramic holder 14 are contained inside the metallic holder 19, and as a result of compressive charging of the material of the talc ring 15, the metallic holder 19 and the talc ring 15 are hermetically integrated together. A rear end portion of the metallic shell 10 is crimped so as to press the ceramic sleeve 17 toward the forward end side through the crimp packing 18. Since the material of the talc ring 16 is compressively charged into the metallic shell 10, the hermetic seal between the inner circumferential surface of the metallic shell 10 and the outer circumferential surface of the sensor element section 5 is ensured.

An outer protector 21 with gas introduction holes and an inner protector 22 with gas introduction holes are disposed at a forward end portion of the metallic shell 10. The outer protector 21 and the inner protector 22 are each a tubular member formed from a metallic material such as stainless steel and having a closed forward end. The inner protector 22 covers a forward end portion of the sensor element section 5 and is welded to the metallic shell 10, and the outer protector 21 covers the inner protector 22 and is welded to the metallic shell 10.

A forward end portion of an outer tube 31 formed into a tubular shape is welded to the outer circumference of a rear portion of the metallic shell 10. A grommet 32 is disposed in a rear end opening of the outer tube 31 so as to close the opening.

Lead wire insertion holes 33 into which lead wires 41 are inserted are formed in the grommet 32. The lead wires 41 are electrically connected to the electrode terminal portions 5A and 5B of the sensor element section 5.

The separator 34 is a tubular member disposed rearward of the sensor element section 5. A space formed inside the separator 34 is an insertion hole 35 extending through the separator 34 in the direction of the axial line O. A flange portion 36 protruding radially outward is formed on the outer surface of the separator 34.

A rear end portion of the sensor element section 5 is inserted into the insertion hole 35 of the separator 34, and the electrode terminal portions 5A and 5B are disposed inside the separator 34.

A tubular metallic holding member 37 is disposed between the separator 34 and the outer tube 31. The holding member 37 is in contact with the flange portion 36 of the separator 34 and also with the inner surface of the outer tube 31 and thereby holds the separator 34 such that the separator 34 is fixed to the outer tube 31.

The connection terminals 38 are members disposed inside the insertion hole 35 of the separator 34 and are electrically conductive members that electrically connect the electrode terminal portions 5A and 5B of the sensor element section 5 to their respective lead wires 41. In FIG. 1, only two connection terminals 38 are shown for the purpose of simplifying the drawing.

As shown in FIG. 2, the control section 3 of the multi-gas detection apparatus is electrically connected to an electronic controller 200 mounted on the own vehicle. The electronic controller 200 receives data representing the concentration of $NO_2$, the concentration of NOx, and the concentration of ammonia (hereinafter referred to as the concentration of $NH_3$) in exhaust gas that are computed by the control section 3. Then the electronic controller 200 performs processing for controlling the operating state of the internal combustion engine on the basis of the data received and also performs cleaning processing for NOx accumulated in the catalyst.

Figure 3:
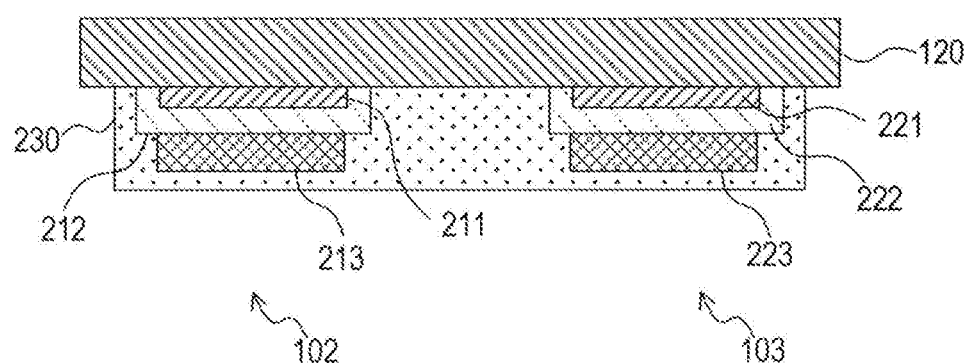
FIG. 3 is a cross-sectional view showing the structure of a first ammonia detection section 102 and a second ammonia detection section 103.

The sensor element section 5 includes the NOx detection section 101, the first ammonia detection section 102, and the second ammonia detection section 103. The second ammonia detection section 103 is not shown in FIG. 2 but is shown in FIG. 3. The first ammonia detection section 102 and the second ammonia detection section 103 are disposed in parallel at approximately the same position as a reference electrode 143 in the longitudinal direction of the NOx detection section 101 (i.e., the horizontal direction in FIG. 2) in such a manner that the first ammonia detection section 102 and the second ammonia detection section 103 are located at different positions in the width direction of the NOx detection section 101 (i.e., the direction perpendicular to the sheet on which FIG. 2 is depicted). Therefore, in FIG. 2, of the first ammonia detection section 102 and the second ammonia detection section 103, only the first ammonia detection section 102 is shown.

The NOx detection section 101 is formed by sequentially stacking an insulating layer 113, a ceramic layer 114, an insulating layer 115, a ceramic layer 116, an insulating layer 117, a ceramic layer 118, an insulating layer 119, and an insulating layer 120. The insulating layers 113, 115, 117, 119, and 120 and the ceramic layers 114, 116, and 118 are formed mainly of alumina.

The NOx detection section 101 includes a first measurement chamber 121 formed between the ceramic layer 114 and the ceramic layer 116. In the NOx detection section 101, the exhaust gas is introduced from the outside into the interior of the first measurement chamber 121 through a diffusion resistor 122 that is disposed between the ceramic layer 114 and the ceramic layer 116 so as to be adjacent to the first measurement chamber 121. The diffusion resistor 122 is formed of a porous material such as alumina.

The NOx detection section 101 further includes a first pumping cell 130. The first pumping cell 130 includes a solid electrolyte layer 131 and pumping electrodes 132 and 133.

The solid electrolyte layer 131 is formed mainly of zirconia having oxygen ion conductivity. A part of the ceramic layer 114 is removed from a region exposed to the first measurement chamber 121. Instead of the ceramic layer 114, the solid electrolyte layer 131 is embedded in the resulting space.

The pumping electrodes 132 and 133 are formed mainly of platinum. The pumping electrode 132 is disposed on a surface of the solid electrolyte layer 131, which surface is exposed to the first measurement chamber 121. The pumping electrode 133 is disposed on a surface of the solid electrolyte layer 131, which surface is located on the side opposite the pumping electrode 132 with respect to the solid electrolyte layer 131. The insulating layer 113 is removed from a region in which the pumping electrode 133 is disposed and from a region around the pumping electrode 133, and the resulting space is filled with a porous material 134 instead of the insulating layer 113. The porous material 134 allows gas (e.g., oxygen) migration between the pumping electrode 133 and the outside.

The NOx detection section 101 further includes an oxygen concentration detection cell 140. The oxygen concentration detection cell 140 includes a solid electrolyte layer 141, a detection electrode 142, and the reference electrode 143.

The solid electrolyte layer 141 is formed mainly of zirconia having oxygen ion conductivity. A part of the ceramic layer 116 is removed from a region on the rear end side (i.e., the right side of FIG. 2) of the solid electrolyte layer 131. Instead of the ceramic layer 116, the solid electrolyte layer 141 is embedded in the resulting space.

The detection electrode 142 and the reference electrode 143 are formed mainly of platinum. The detection electrode 142 is disposed on a surface of the solid electrolyte layer 141, which surface is exposed to the first measurement chamber 121. The reference electrode 143 is disposed on a surface of the solid electrolyte layer 141, which surface is located on the side opposite the detection electrode 142 with respect to the solid electrolyte layer 141.

The NOx detection section 101 includes a reference oxygen chamber 146. The reference oxygen chamber 146 is a through hole formed by removing the insulating layer 117 from a region in which the reference electrode 143 is disposed and from a region around the reference electrode 143.

The NOx detection section 101 includes a second measurement chamber 148 disposed downstream of the first measurement chamber 121. The second measurement chamber 148 is formed rearward of the detection electrode 142 and the reference electrode 143 so as to pass through the solid electrolyte layer 141 and the insulating layer 117. In the NOx detection section 101, the exhaust gas discharged from the first measurement chamber 121 is introduced into the second measurement chamber 148.

The NOx detection section 101 includes a second pumping cell 150. The second pumping cell 150 includes a solid electrolyte layer 151 and pumping electrodes 152 and 153.

The solid electrolyte layer 151 is formed mainly of zirconia having oxygen ion conductivity. The ceramic layer 118 is removed from a region exposed to the reference oxygen chamber 146 and the second measurement chamber 148 and a region around this exposed region. Instead of the ceramic layer 118, the solid electrolyte layer 151 is embedded in the resulting space.

The pumping electrodes 152 and 153 are formed mainly of platinum. The pumping electrode 152 is disposed on a surface of the solid electrolyte layer 151, which surface is exposed to the second measurement chamber 148. The pumping electrode 153 is disposed on the solid electrolyte layer 151 to be located on one side of the reference oxygen chamber 146 opposite the reference electrode 143. A porous material 147 is disposed inside the reference oxygen chamber 146 so as to cover the pumping electrode 153.

The NOx detection section 101 includes a heater 160. The heater 160 is a heat-generating resistor that is formed mainly of platinum and generates heat when energized and is disposed between the insulating layers 119 and 120.

The first ammonia detection section 102 is formed on the outer surface of the NOx detection section 101, more specifically on the insulating layer 120. The first ammonia detection section 102 is disposed at approximately the same position, with respect to the direction of the axial line O (i.e., the horizontal direction in FIG. 2), as the reference electrode 143 in the NOx detection section 101.

The first ammonia detection section 102 includes a first reference electrode 211 formed on the insulating layer 120, a first solid electrolyte body 212 covering the front and side surfaces of the first reference electrode 211, and a first detection electrode 213 formed on the front surface of the first solid electrolyte body 212. Similarly, as shown in FIG. 3, the second ammonia detection section 103 includes a second reference electrode 221 formed on the insulating layer 120, a second solid electrolyte body 222 covering the front and side surfaces of the second reference electrode 221, and a second detection electrode 223 formed on the front surface of the second solid electrolyte body 222.

The first reference electrode 211 and the second reference electrode 221 are formed mainly of platinum used as an electrode material and more specifically formed of a material containing Pt and zirconium oxide. The first solid electrolyte body 212 and the second solid electrolyte body 222 are formed of an oxygen ion-conductive material such as yttria-stabilized zirconia. The first detection electrode 213 and the second detection electrode 223 are formed mainly of gold used as an electrode material and more specifically formed of a material containing Au and zirconium oxide. The electrode materials of the first detection electrode 213 and the second detection electrode 223 are selected such that the first ammonia detection section 102 and the second ammonia detection section 103 differ from each other in terms of the ratio between the sensitivity to ammonia and the sensitivity to NOx.

The first ammonia detection section 102 and the second ammonia detection section 103 are integrally covered with a porous protecting layer 230. The protecting layer 230 is configured to prevent adhesion of a poisoning material to the first detection electrode 213 and the second detection electrode 223 and to control the diffusion rate of ammonia flowing from the outside into the first ammonia detection section 102 and the second ammonia detection section 103. As described above, the first ammonia detection section 102 and the second ammonia detection section 103 function as mixed potential sensing sections.

As shown in FIG. 2, the control section 3 includes a control circuit 180 and a microcomputer 190.

The control circuit 180 is an analog circuit disposed on a circuit board. The control circuit 180 includes an Ip1 drive circuit 181, a Vs detection circuit 182, a reference voltage comparison circuit 183, an Icp supply circuit 184, a Vp2 application circuit 185, an Ip2 detection circuit 186, a heater drive circuit 187, and an electromotive force detection circuit 188.

The pumping electrode 132, the detection electrode 142, and the pumping electrode 152 are connected to a reference potential. The pumping electrode 133 is connected to the Ip1 drive circuit 181. The reference electrode 143 is connected to the Vs detection circuit 182 and the Icp supply circuit 184. The pumping electrode 153 is connected to the Vp2 application circuit 185 and the Ip2 detection circuit 186. The heater 160 is connected to the heater drive circuit 187.

The Ip1 drive circuit 181 applies a voltage Vp1 between the pumping electrode 132 and the pumping electrode 133 to supply a first pumping current Ip1 and detects the supplied first pumping current Ip1.

The Vs detection circuit 182 detects the voltage Vs between the detection electrode 142 and the reference electrode 143 and outputs the detection result to the reference voltage comparison circuit 183.

The reference voltage comparison circuit 183 compares a reference voltage (e.g., 425 mV) with the output from the Vs detection circuit 182 (i.e., the voltage Vs) and outputs the comparison result to the Ip1 drive circuit 181. The Ip1 drive circuit 181 controls the direction and magnitude of the first pumping current Ip1 such that the voltage Vs becomes equal to the reference voltage to thereby adjust the concentration of oxygen in the first measurement chamber 121 to a prescribed value at which decomposition of NOx does not occur.

The Icp supply circuit 184 causes a weak current Icp to flow between the detection electrode 142 and the reference electrode 143. Oxygen is thereby fed from the first measurement chamber 121 to the reference oxygen chamber 146 through the solid electrolyte layer 141, and the concentration of oxygen in the reference oxygen chamber 146 is set to be a prescribed oxygen concentration serving as a reference.

The Vp2 application circuit 185 applies a constant voltage Vp2 (e.g., 450 mV) between the pumping electrode 152 and the pumping electrode 153. In the second measurement chamber 148, NOx is dissociated through the catalytic action of the pumping electrodes 152 and 153 of the second pumping cell 150. The oxygen ions obtained as a result of the dissociation migrate in the solid electrolyte layer 151 between the pumping electrode 152 and the pumping electrode 153, so that a second pumping current Ip2 flows. The Ip2 detection circuit 186 detects the second pumping current Ip2.

The heater drive circuit 187 applies a positive voltage for heater energization to one end of the heater 160, which is a heat-generating resistor, and applies a negative voltage for heater energization to the other end of the heater 160 to thereby drive the heater 160.

The electromotive force detection circuit 188 detects the electromotive force between the first reference electrode 211 and the first detection electrode 213 (hereinafter referred to as a first ammonia electromotive force EMF1) and the electromotive force between the second reference electrode 221 and the second detection electrode 223 (hereinafter referred to as a second ammonia electromotive force EMF2), and outputs signals representing the detection results to the microcomputer 190.

The microcomputer 190 includes a CPU 191, a ROM 192 as an example of a storage section, a RAM 193 as another example of a storage section, and a signal input/output section 194. The CPU 191 executes software modules in the form of: a flammable gas determination section; an information setting section; an electromotive force end determination section; an oxygen concentration computation section; and an oxygen end determination section, and executes programs stored in a non-transitory tangible recording medium to implement various functions of the microcomputer. In the present example, the ROM 192 corresponds to the non-transitory tangible recording medium in which the programs are stored. When one of the programs is executed, a method corresponding to the program is executed. The number of microcomputers included in the control section 3 may be one or may be two or more. Part or all of the functions executed by the microcomputer 190 may be implemented by hardware using one or a plurality of ICs, etc.

The CPU 191 executes a process for controlling the sensor element section 5 according to a program stored in the ROM 192. The signal input/output section 194 is connected to the Ip1 drive circuit 181, the Vs detection circuit 182, the Ip2 detection circuit 186, the heater drive circuit 187, and the electromotive force detection circuit 188. The signal input/output section 194 converts the voltage values of analog signals from the Ip1 drive circuit 181, the Vs detection circuit 182, the Ip2 detection circuit 186, and the electromotive force detection circuit 188 to digital data and outputs the digital data to the CPU 191.

The CPU 191 outputs a driving signal to the heater drive circuit 187 through the signal input/output section 194 so as to control the electric power supplied to the heater 160 by means of pulse width modulation such that the heater 160 reaches a target temperature. To control the electric power supplied to the heater 160, any known method may be used.

Specifically, the impedance of a cell (e.g., the oxygen concentration detection cell 140) included in the NOx detection section 101 is detected, and then the amount of the electric power supplied is controlled such that the impedance detected reaches a target value.

The CPU 191 reads various data from the ROM 192 and performs various computation processes on the basis of the value of the first pumping current Ip1, the value of the second pumping current Ip2, the value of the first ammonia electromotive force EMF1, and the value of the second ammonia electromotive force EMF2.

The ROM 192 stores a "first ammonia electromotive force–first ammonia concentration output relational expression," a "second ammonia electromotive force–second ammonia concentration output relational expression," a "first pumping current–oxygen concentration relational expression," a "second pumping current–NOx concentration output relational expression," a "first ammonia concentration output & second ammonia concentration output & oxygen concentration–corrected ammonia concentration relational expression," a "first ammonia concentration output & second ammonia concentration output & oxygen concentration–corrected $NO_2$ concentration relational expression," and an "NOx concentration output & corrected ammonia concentration & corrected $NO_2$ concentration–corrected NOx concentration relational expression."

Notably, the "first ammonia concentration output & second ammonia concentration output & oxygen concentration–corrected ammonia concentration relational expression" corresponds to correction expression (1) below. The "first ammonia concentration output & second ammonia concentration output & oxygen concentration–corrected $NO_2$ concentration relational expression" corresponds to correction expression (2) below. The "NOx concentration output & corrected ammonia concentration & corrected $NO_2$ concentration–corrected NOx concentration relational expression" corresponds to correction expression (3) below.

The various data may be set in the form of predetermined relational expressions as described above or may be set in other forms (for example, tables) so long as various gas concentrations can be calculated from the outputs of the sensor. Alternatively, they may be values obtained through the use of a model gas whose gas concentration is known.

The "first ammonia electromotive force–first ammonia concentration output relational expression" and the "second ammonia electromotive force–second ammonia concentration output relational expression" are expressions representing the relation between the ammonia electromotive forces outputted from the first ammonia detection section 102 and the second ammonia detection section 103 and the ammonia concentration outputs.

The "first pumping current–oxygen concentration relational expression" is an expression representing the relation between the first pumping current and the oxygen concentration (i.e., the $O_2$ concentration) in the exhaust gas. The "second pumping current–NOx concentration output relational expression" is an expression representing the relation between the second pumping current and the NOx concentration output.

The "first ammonia concentration output & second ammonia concentration output & oxygen concentration–corrected ammonia concentration relational expression" is an expression representing the relation between the first and second ammonia concentration outputs affected by the oxygen concentration, the ammonia concentration, and the $NO_2$ concentration and the corrected ammonia concentration from which the influences of the oxygen concentration and the NO$_2$ concentration have been removed. The "first ammonia concentration output & second ammonia concentration output & oxygen concentration–corrected NO$_2$ concentration relational expression" is an expression representing the relation between the first and second ammonia concentration outputs affected by the oxygen concentration, the ammonia concentration, and the NO$_2$ concentration and the corrected NO$_2$ concentration from which the influences of the oxygen concentration and the ammonia concentration have been removed. The "NOx concentration output & corrected ammonia concentration & corrected NO$_2$ concentration–corrected NOx concentration relational expression" is an expression representing the relation between the NOx concentration output affected by the ammonia concentration and the NO$_2$ concentration and the corrected NOx concentration from which the influences of the ammonia concentration and the NO$_2$ concentration have been removed.

A description will next be given of a computation process for determining the NO$_2$ concentration, the NOx concentration, and the ammonia concentration from the first pumping current Ip1, the second pumping current Ip2, the first ammonia electromotive force EMF1, and the second ammonia electromotive force EMF2. This computation process is executed by the CPU 191 of the microcomputer 190.

When the first pumping current Ip1, the second pumping current Ip2, the first ammonia electromotive force EMF1, and the second ammonia electromotive force EMF2 are inputted, the CPU 191 performs a computation process for determining the oxygen concentration, the NOx concentration output, the first ammonia concentration output, and the second ammonia concentration output. Specifically, the CPU 191 calls the "first ammonia electromotive force–first ammonia concentration output relational expression," the "second ammonia electromotive force–second ammonia concentration output relational expression," the "first pumping current Ip1–oxygen concentration relational expression," and the "second pumping current Ip2–NOx concentration output relational expression" from the ROM 192 and then calculates the oxygen concentration and the concentration outputs using these relational expressions.

Notably, the "first ammonia electromotive force–first ammonia concentration output relational expression" and the "second ammonia electromotive force–second ammonia concentration output relational expression" are set such that, over the entire possible range of the ammonia electromotive forces outputted from the first and second ammonia detection sections 102 and 103 in their use environment, an approximately linear relation is present between each of the ammonia concentration outputs from the first and second ammonia detection sections 102 and 103 and the ammonia concentration in the gas under measurement. Since these conversion expressions are used for conversion, in the correction expressions below, calculation which utilizes changes in gradient and offset is possible.

After the oxygen concentration, the NOx concentration output, the first ammonia concentration output, and the second ammonia concentration output are determined, the CPU 191 performs computations using the correction expressions described below to determine the ammonia concentration, NO$_2$ concentration, and NOx concentration in the exhaust gas.

Correction expression (1)
$$x = F(A, B, D)$$
$$= (eA - c) * (jB - h - fA + d)/(eA - c - iB + g) + fA - d$$

Correction expression (2)
$$y = F'(A, B, D)$$
$$= (jB - h - fA + d)/(eA - c - iB + g)$$

Correction expression (3)
$$z = C - ax + by$$

In these correction expressions, x represents the ammonia concentration, y represents the NO$_2$ concentration, and z represents the NOx concentration. A represents the first ammonia concentration output, B represents the second ammonia concentration output, C represents the NOx concentration output, and D represents the oxygen concentration. F in the correction expression (1) represents that x is a function of A, B, and D, and F' in the correction expression (2) represents that y is a function of A, B, and D. a and b are correction coefficients, and c, d, e, f, g, h, and j are coefficients calculated using the oxygen concentration D (i.e., coefficients determined by D).

The CPU 191 determines the ammonia concentration, the NO$_2$ concentration, and the NOx concentration in the exhaust gas by substituting the first ammonia concentration output, the second ammonia concentration output, the NOx concentration output, and the oxygen concentration into the above-described correction expressions (1) to (3).

Notably, the correction expressions (1) and (2) are determined on the basis of the characteristics of the first and second ammonia detection sections 102 and 103, and the correction expression (3) is determined on the basis of the characteristics of the NOx detection section 101. The correction expressions (1) to (3) are merely examples, and other correction expressions, coefficients, etc. may be appropriately used in accordance with the characteristics of gas detection.

The microcomputer 190 in the control section 3 executes a gas concentration computation process and a gas leakage diagnosing process. After the electric power is supplied to the heater 160 and the sensor element section 5 is heated to its activation temperature by the heat generated by the heater 160, each of the gas concentration computation process and the gas leakage diagnosing process is executed every time an execution period elapses. In the present embodiment, the execution period is 100 ms.

In the RAM 193 of the microcomputer 190, there are provided storage areas respectively named "current first pumping current Ip1_0," "one-cycle-ago first pumping current Ip1_1," "two-cycles-ago first pumping current Ip1_2," "three-cycles-ago first pumping current Ip1_3," "four-cycles-ago first pumping current Ip1_4," and "five-cycles-ago first pumping current Ip1_5."

In the RAM 193 of the microcomputer 190, there are provided storage areas respectively named "current second pumping current Ip2_0," "one-cycle-ago second pumping current Ip2_1," "two-cycles-ago second pumping current Ip2_2," "three-cycles-ago second pumping current Ip2_3," "four-cycles-ago second pumping current Ip2_4," and "five-cycles-ago second pumping current Ip2_5."

In the RAM 193 of the microcomputer 190, there are provided storage areas respectively named "current first ammonia electromotive force EMF1_0," "one-cycle-ago first ammonia electromotive force EMF1_1," "two-cycles-ago first ammonia electromotive force EMF1_2," "three-cycles-ago first ammonia electromotive force EMF1_3," "four-cycles-ago first ammonia electromotive force EMF1_4," and "five-cycles-ago first ammonia electromotive force EMF1_5."

In the RAM 193 of the microcomputer 190, there are provided storage areas respectively named "current second ammonia electromotive force EMF2_0," "one-cycle-ago second ammonia electromotive force EMF2_1," "two-cycles-ago second ammonia electromotive force EMF2_2," "three-cycles-ago second ammonia electromotive force EMF2_3," "four-cycles-ago second ammonia electromotive force EMF2_4," and "five-cycles-ago second ammonia electromotive force EMF2_5."

In the RAM 193 of the microcomputer 190, there are provided storage areas respectively named "calculated oxygen concentration C_O2_CAL," "current oxygen concentration C_O2_0," "one-cycle-ago oxygen concentration C_O2_1," and "two-cycles-ago oxygen concentration C_O2_2."

In the RAM 193 of the microcomputer 190, there are provided storage areas respectively named "output first pumping current Ip1_OUT," "output second pumping current Ip2_OUT," "output first ammonia electromotive force EMF1_OUT," and "output second ammonia electromotive force EMF2_OUT."

In the following description, the values stored in the above-mentioned storage areas may be referred to by the names of the storage areas where they are stored respectively.

Now, the steps of the gas concentration computation process will be described.

Figure 4:
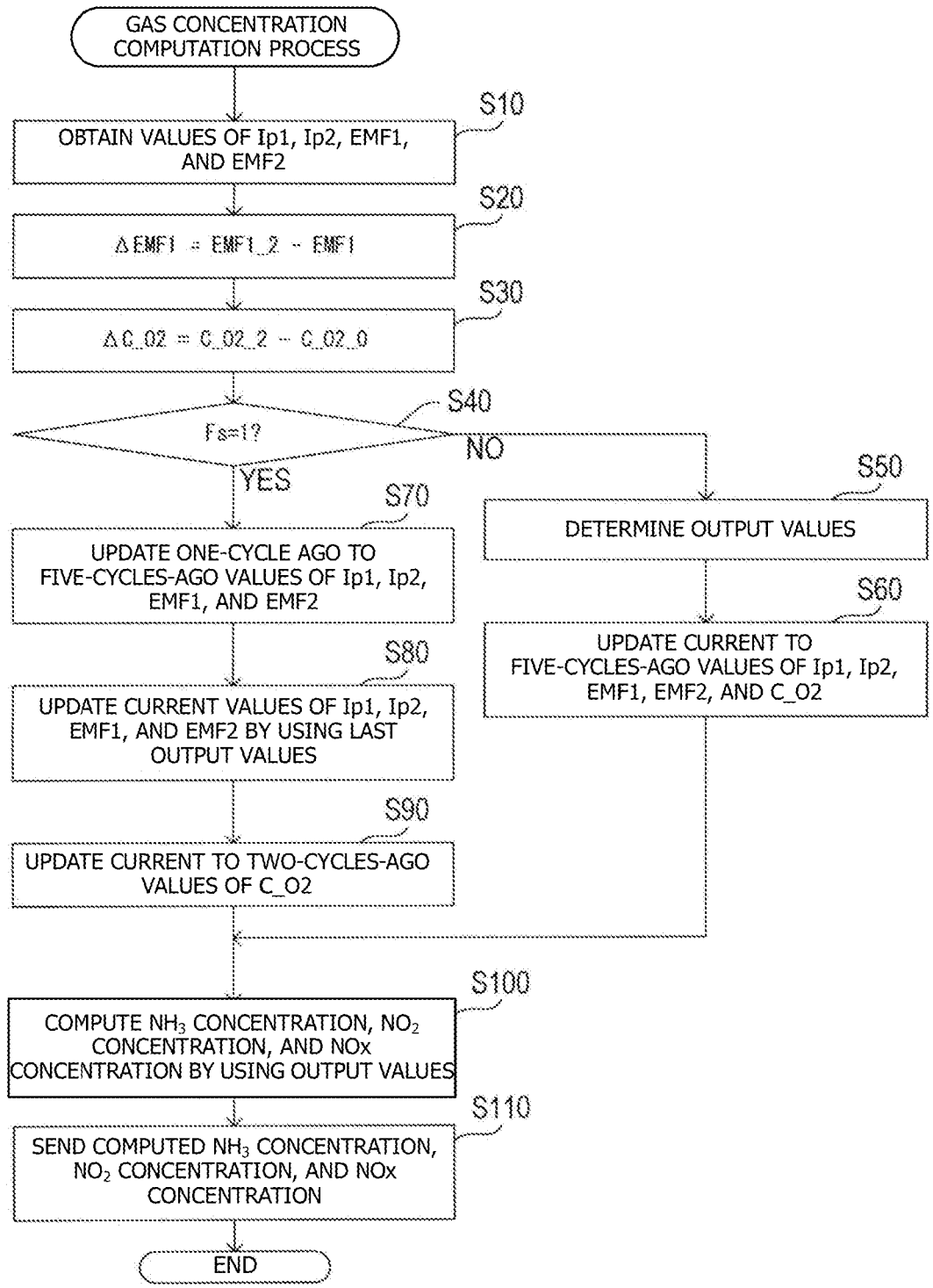
FIG. 4 is a flowchart showing a gas concentration computation process.

As shown in FIG. 4, when the gas concentration computation process is executed, first in S10, the CPU 191 of the microcomputer 190 obtains the first pumping current Ip1, the second pumping current Ip2, the first ammonia electromotive force EMF1, and the second ammonia electromotive force EMF2 input from the control circuit 180.

Subsequently, in S20, the CPU 191 computes a first ammonia electromotive force change amount ΔEMF1. Specifically, through use of the first ammonia electromotive force EMF1 and the two-cycles-ago first ammonia electromotive force EMF1_2 obtained in S10, the CPU 191 computes the first ammonia electromotive force change amount ΔEMF1 in accordance with the following expression (4).

$$\Delta EMF1 = EMF1\_2 - EMF1 \quad (4)$$

Also, in S30, the CPU 191 computes an oxygen concentration change amount ΔC_O2. Specifically, the CPU 191 first computes an oxygen concentration on the basis of the first pumping current Ip1 obtained in S10 and the "first pumping current–oxygen concentration relational expression" and stores the calculated oxygen concentration in the calculated oxygen concentration C_O2_CAL. Subsequently, through use of this calculated oxygen concentration C_O2_CAL and the two-cycles-ago oxygen concentration C_O2_2, the CPU 191 computes the oxygen concentration change amount ΔC_O2 in accordance with the following expression (5).

$$\Delta C\_O2 = C\_O2\_2 - C\_O2\_CAL \quad (5)$$

Subsequently, in S40, the CPU 191 determines whether or not a rich spike flag Fs provided in the RAM 193 is in a set state. The rich spike flag Fs is set to 1 or 0 by the gas leakage diagnosing process which will be described later. In the following description, an operation in which the flag is set to 1 will be denoted by an expression "the flag is set," and an operation in which the flag is set to 0 will be denoted by an expression "the flag is cleared."

In the case where the rich spike flag Fs is in a cleared state, in S50, the CPU 191 determines a first pumping current Ip1, a second pumping current Ip2, a first ammonia electromotive force EMF1, and a second ammonia electromotive force EMF2 which are to be output. Specifically, first the CPU 191 reads out the value stored in the five-cycles-ago first pumping current Ip1_5 and stores it in the output first pumping current Ip1_OUT. Also, the CPU 191 reads out the value stored in the five-cycles-ago second pumping current Ip2_5 and stores it in the output second pumping current Ip2_OUT. Also, the CPU 191 reads out the value stored in the five-cycles-ago first ammonia electromotive force EMF1_5 and stores it in the output first ammonia electromotive force EMF1_OUT. Also, the CPU 191 reads out the value stored in the five-cycles-ago second ammonia electromotive force EMF2_5 and stores it in the output second ammonia electromotive force EMF2_OUT.

In the following description, the values stored in the output first pumping current Ip1_OUT, the output second pumping current Ip2_OUT, the output first ammonia electromotive force EMF1_OUT, and the output second ammonia electromotive force EMF2_OUT will also be referred to as "output values."

Subsequently, in S60, the CPU 191 updates the current, one-cycle-ago, second-cycles-ago, third-cycles-ago, four-cycles-ago, and five-cycles-ago first pumping currents Ip1; the current, one-cycle-ago, second-cycles-ago, third-cycles-ago, four-cycles-ago, and five-cycles-ago second pumping currents Ip2; the current, one-cycle-ago, second-cycles-ago, third-cycles-ago, four-cycles-ago, and five-cycles-ago first ammonia electromotive forces EMF1; the current, one-cycle-ago, second-cycles-ago, third-cycles-ago, four-cycles-ago, and five-cycles-ago second ammonia electromotive forces EMF2; and the current, one-cycle-ago, second-cycles-ago, third-cycles-ago, four-cycles-ago, and five-cycles-ago oxygen concentrations C_O2.

Specifically, first, the CPU 191 reads out the value stored in the four-cycles-ago first pumping current Ip1_4 and stores it in the five-cycles-ago first pumping current Ip1_5. The CPU 191 reads out the value stored in the three-cycles-ago first pumping current Ip1_3 and stores it in the four-cycles-ago first pumping current Ip1_4. The CPU 191 reads out the value stored in the two-cycles-ago first pumping current Ip1_2 and stores it in the three-cycles-ago first pumping current Ip1_3. The CPU 191 reads out the value stored in the one-cycle-ago first pumping current Ip1_1 and stores it in the two-cycles-ago first pumping current Ip1_2. The CPU 191 reads out the value stored in the current first pumping current Ip1_0 and stores it in the one-cycle-ago first pumping current Ip1_1. The CPU 191 stores the first pumping current Ip1 obtained in S10 in the current first pumping current Ip1_0.

Also, the CPU 191 reads out the value stored in the four-cycles-ago second pumping current Ip2_4 and stores it in the five-cycles-ago second pumping current Ip2_5. The CPU 191 reads out the value stored in the three-cycles-ago second pumping current Ip2_3 and stores it in the four-cycles-ago second pumping current Ip2_4. The CPU 191 reads out the value stored in the two-cycles-ago second pumping current Ip2_2 and stores it in the three-cycles-ago second pumping current Ip2_3. The CPU 191 reads out the value stored in the one-cycle-ago second pumping current Ip2_1 and stores it in the two-cycles-ago second pumping current Ip2_2. The CPU 191 reads out the value stored in the current second pumping current Ip2_0 and stores it in the one-cycle-ago second pumping current Ip2_1. The CPU 191 stores the second pumping current Ip2 obtained in S10 in the current second pumping current Ip2_0.

Also, the CPU 191 reads out the value stored in the four-cycles-ago first ammonia electromotive force EMF1_4 and stores it in the five-cycles-ago first ammonia electromotive force EMF1_5. The CPU 191 reads out the value stored in the three-cycles-ago first ammonia electromotive force EMF1_3 and stores it in the four-cycles-ago first ammonia electromotive force EMF1_4. The CPU 191 reads out the value stored in the two-cycles-ago first ammonia electromotive force EMF1_2 and stores it in the three-cycles-ago first ammonia electromotive force EMF1_3. The CPU 191 reads out the value stored in the one-cycle-ago first ammonia electromotive force EMF1_1 and stores it in the two-cycles-ago first ammonia electromotive force EMF1_2. The CPU 191 reads out the value stored in the current first ammonia electromotive force EMF1_0 and stores it in the one-cycle-ago first ammonia electromotive force EMF1_1. The CPU 191 stores the first ammonia electromotive force EMF1 obtained in S10 in the current first ammonia electromotive force EMF1_0.

Also, the CPU 191 reads out the value stored in the four-cycles-ago second ammonia electromotive force EMF2_4 and stores it in the five-cycles-ago second ammonia electromotive force EMF2_5. The CPU 191 reads out the value stored in the three-cycles-ago second ammonia electromotive force EMF2_3 and stores it in the four-cycles-ago second ammonia electromotive force EMF2_4. The CPU 191 reads out the value stored in the two-cycles-ago second ammonia electromotive force EMF2_2 and stores it in the three-cycles-ago second ammonia electromotive force EMF2_3. The CPU 191 reads out the value stored in the one-cycle-ago second ammonia electromotive force EMF2_1 and stores it in the two-cycles-ago second ammonia electromotive force EMF2_2. The CPU 191 reads out the value stored in the current second ammonia electromotive force EMF2_0 and stores it in the one-cycle-ago second ammonia electromotive force EMF2_1. The CPU 191 stores the second ammonia electromotive force EMF2 obtained in S10 in the current second ammonia electromotive force EMF2_0.

Also, the CPU 191 reads out the value stored in the one-cycle-ago oxygen concentration C_O2_1 and stores it in the two-cycles-ago oxygen concentration C_O2_2. The CPU 191 reads out the value stored in the current oxygen concentration C_O2_0 and stores it in the one-cycle-ago oxygen concentration C_O2_1. The CPU 191 reads out the value stored in the calculated oxygen concentration C_O2_CAL and stores it in the current oxygen concentration C_O2_0.

After completion of the process of S60, the CPU 191 proceeds to S100.

Meanwhile, in the case where the CPU 191 determines in S40 that the rich spike flag Fs is in the set state, in S70, the CPU 191 updates the one-cycle-ago, second-cycles-ago, third-cycles-ago, four-cycles-ago, and five-cycles-ago first pumping currents Ip1; the one-cycle-ago, second-cycles-ago, third-cycles-ago, four-cycles-ago, and five-cycles-ago second pumping currents Ip2; the one-cycle-ago, second-cycles-ago, third-cycles-ago, four-cycles-ago, and five-cycles-ago first ammonia electromotive forces EMF1; and the one-cycle-ago, second-cycles-ago, third-cycles-ago, four-cycles-ago, and five-cycles-ago second ammonia electromotive forces EMF2.

Specifically, first, the CPU 191 reads out the value stored in the four-cycles-ago first pumping current Ip1_4 and stores it in the five-cycles-ago first pumping current Ip1_5. The CPU 191 reads out the value stored in the three-cycles-ago first pumping current Ip1_3 and stores it in the four-cycles-ago first pumping current Ip1_4. The CPU 191 reads out the value stored in the two-cycles-ago first pumping current Ip1_2 and stores it in the three-cycles-ago first pumping current Ip1_3. The CPU 191 reads out the value stored in the one-cycle-ago first pumping current Ip1_1 and stores it in the two-cycles-ago first pumping current Ip1_2. The CPU 191 reads out the value stored in the current first pumping current Ip1_0 and stores it in the one-cycle-ago first pumping current Ip1_1.

Also, the CPU 191 reads out the value stored in the four-cycles-ago second pumping current Ip2_4 and stores it in the five-cycles-ago second pumping current Ip2_5. The CPU 191 reads out the value stored in the three-cycles-ago second pumping current Ip2_3 and stores it in the four-cycles-ago second pumping current Ip2_4. The CPU 191 reads out the value stored in the two-cycles-ago second pumping current Ip2_2 and stores it in the three-cycles-ago second pumping current Ip2_3. The CPU 191 reads out the value stored in the one-cycle-ago second pumping current Ip2_1 and stores it in the two-cycles-ago second pumping current Ip2_2. The CPU 191 reads out the value stored in the current second pumping current Ip2_0 and stores it in the one-cycle-ago second pumping current Ip2_1.

Also, the CPU 191 reads out the value stored in the four-cycles-ago first ammonia electromotive force EMF1_4 and stores it in the five-cycles-ago first ammonia electromotive force EMF1_5. The CPU 191 reads out the value stored in the three-cycles-ago first ammonia electromotive force EMF1_3 and stores it in the four-cycles-ago first ammonia electromotive force EMF1_4. The CPU 191 reads out the value stored in the two-cycles-ago first ammonia electromotive force EMF1_2 and stores it in the three-cycles-ago first ammonia electromotive force EMF1_3. The CPU 191 reads out the value stored in the one-cycle-ago first ammonia electromotive force EMF1_1 and stores it in the two-cycles-ago first ammonia electromotive force EMF1_2. The CPU 191 reads out the value stored in the current first ammonia electromotive force EMF1_0 and stores it in the one-cycle-ago first ammonia electromotive force EMF1_1.

Also, the CPU 191 reads out the value stored in the four-cycles-ago second ammonia electromotive force EMF2_4 and stores it in the five-cycles-ago second ammonia electromotive force EMF2_5. The CPU 191 reads out the value stored in the three-cycles-ago second ammonia electromotive force EMF2_3 and stores it in the four-cycles-ago second ammonia electromotive force EMF2_4. The CPU 191 reads out the value stored in the two-cycles-ago second ammonia electromotive force EMF2_2 and stores it in the three-cycles-ago second ammonia electromotive force EMF2_3. The CPU 191 reads out the value stored in the one-cycle-ago second ammonia electromotive force EMF2_1 and stores it in the two-cycles-ago second ammonia electromotive force EMF2_2. The CPU 191 reads out the value stored in the current second ammonia electromotive force EMF2_0 and stores it in the one-cycle-ago second ammonia electromotive force EMF2_1.

Subsequently, in S80, the CPU 191 updates the first pumping current Ip1, the second pumping current Ip2, the first ammonia electromotive force EMF1, and the second ammonia electromotive force EMF2 at the present point in time by using the respective last output values. Specifically, first, the CPU 191 reads out the value stored in the output first pumping current Ip1_OUT and stores it in the current first pumping current Ip1_0. Also, the CPU 191 reads out the value stored in the output second pumping current Ip2_OUT and stores it in the current second pumping current Ip2_0. Also, the CPU 191 reads out the value stored in the output first ammonia electromotive force EMF1_OUT and stores it in the current first ammonia electromotive force EMF1_0. Also, the CPU 191 reads out the value stored in the output second ammonia electromotive force EMF2_OUT and stores it in the current second ammonia electromotive force EMF2_0.

Subsequently, in S90, the CPU 191 updates the current, one-cycle-ago, and second-cycles-ago oxygen concentrations C_O2. Specifically, the CPU 191 reads out the value stored in the one-cycle-ago oxygen concentration C_O2_1 and stores it in the two-cycles-ago oxygen concentration C_O2_2. The CPU 191 reads out the value stored in the current oxygen concentration C_O2_0 and stores it in the one-cycle-ago oxygen concentration C_O2_1. The CPU 191 reads out the value stored in the calculated oxygen concentration C_O2_CAL and stores it in the current oxygen concentration C_O2_0.

After completion of the process of S90, the CPU 191 proceeds to S100. Notably, in the case where the CPU 191 determines in S40 that the rich spike flag Fs is in the set state, the CPU 191 does not update the output first pumping current Ip1_OUT, output second pumping current Ip2_OUT, the output first ammonia electromotive force EMF1_OUT, and the output second ammonia electromotive force EMF2_OUT. Namely, in the case where the CPU 191 determines in S40 that the rich spike flag Fs is in the set state, the output first pumping current Ip1_OUT, the output second pumping current Ip2_OUT, the output first ammonia electromotive force EMF1_OUT, and the output second ammonia electromotive force EMF2_OUT hold the respective last values.

In S100, the CPU 191 computes the ammonia concentration, the $NO_2$ concentration, and the NOx concentration on the basis of the output values. Specifically, first, the CPU 191 reads out the value stored in the output first pumping current Ip1_OUT to be used as the first pumping current Ip1. Similarly, the CPU 191 reads out the values stored in the output second pumping current Ip2_OUT, the output first ammonia electromotive force EMF1_OUT, and the output second ammonia electromotive force EMF2_OUT to be used as the second pumping current Ip2, the first ammonia electromotive force EMF1, and the second ammonia electromotive force EMF2, respectively. Subsequently, the CPU 191 performs the above-described computation process so as to compute the ammonia concentration, the $NO_2$ concentration, and the NOx concentration from the first pumping current Ip1, the second pumping current Ip2, the first ammonia electromotive force EMF1, and the second ammonia electromotive force EMF2.

Subsequently, in S110, the CPU 191 transmits to the electronic controller 200 ammonia concentration information, $NO_2$ concentration information, and NOx concentration information which respectively represent the ammonia concentration, $NO_2$ concentration, and NOx concentration calculated in S100, and ends the gas concentration computation process.

Next, the steps of the gas leakage diagnosing process will be described.

Figure 5:
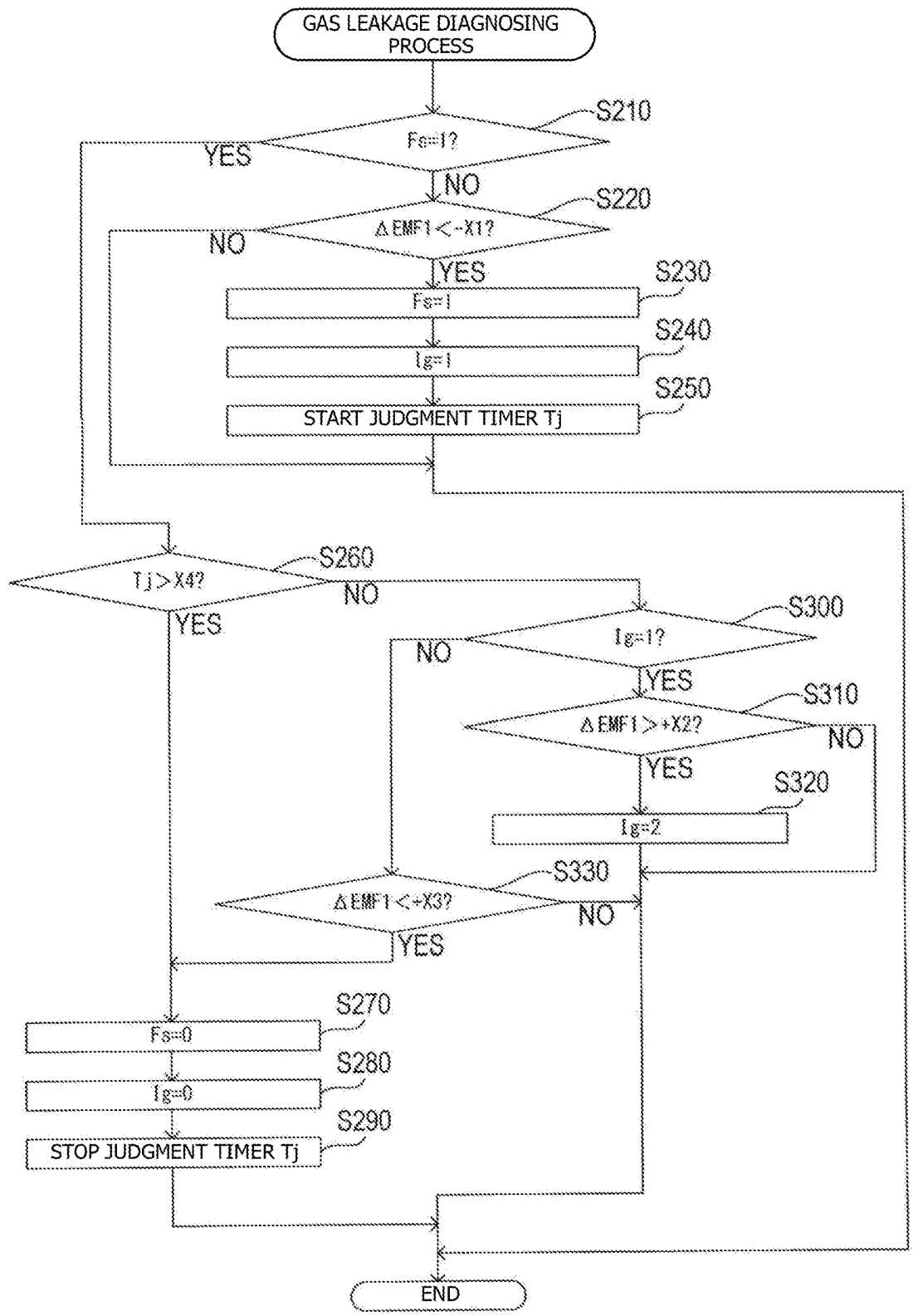
FIG. 5 is a flowchart showing a gas leakage diagnosing process according to a first embodiment.

As shown in FIG. 5, when the gas leakage diagnosing process is executed, the CPU 191 of the microcomputer 190 first determines in S210 whether or not the rich spike flag Fs is in the set state. In the case where the rich spike flag Fs is not in the set state, the CPU 191 determines in S220 whether or not the first ammonia electromotive force change amount $\Delta$EMF1 is smaller than a value obtained by multiplying a preset start determination value X1 by −1. The start determination value X1 is a positive value. In the present embodiment, the start determination value X1 is 15 mV.

In the case where the first ammonia electromotive force change amount $\Delta$EMF1 is equal to or larger than the value obtained by multiplying the start determination value X1 by −1, the CPU 191 ends the current execution of the gas leakage diagnosing process. In the case where the first ammonia electromotive force change amount $\Delta$EMF1 is smaller than the value obtained by multiplying the start determination value X1 by −1, in S230, the CPU 191 sets the rich spike flag Fs. Further, in S240, the CPU 191 sets the gas inflow/outflow instruction Ig provided in the RAM 193 to 1. Subsequently, in S250, the CPU 191 starts a judgment timer Tj provided in the RAM 193 and ends the current execution of the gas leakage diagnosing process. The value of the judgment timer Tj is incremented at intervals of, for example, 10 ms. When the judgment timer Tj is started, its value is incremented from 0 (i.e., 1 is added to the value of the timer Tj whose initial value is 0).

In the case where the CPU 191 determines in S210 that the rich spike flag Fs is in the set state, the CPU 191 determines in S260 whether or not the value of the judgment timer Tj is larger than a continuation determination value X4 set in advance. In the present embodiment, the continuation determination value X4 is, for example, a value corresponding to 2 sec.

In the case where the value of the judgment timer Tj is larger than the continuation determination value X4, the CPU 191 clears the rich spike flag Fs in S270. Further, the CPU 191 sets the gas inflow/outflow instruction Ig to 0 in S280. Subsequently, the CPU 191 stops the operation of incrementing the value of the judgment timer Tj in S290, and ends the current execution of the gas leakage diagnosing process.

Meanwhile, in the case where the value of the judgment timer Tj is equal to or smaller than the continuation determination value X4, in S300, the CPU 191 determines whether or not the value of the gas inflow/outflow instruction Ig is 1. In the case where the value of the gas inflow/outflow instruction Ig is 1, in S310, the CPU 191 determines whether or not the first ammonia electromotive force change amount $\Delta$EMF1 is larger than a first end determination value X2 set in advance. The first end determination value X2 is a positive value. In the present embodiment, the first end determination value X2 is 7 mV.

In the case where the first ammonia electromotive force change amount $\Delta$EMF1 is equal to or smaller than the first end determination value X2, the CPU 191 ends the current execution of the gas leakage diagnosing process. Meanwhile, in the case where the first ammonia electromotive force change amount $\Delta$EMF1 is larger than the first end determination value X2, the CPU 191 sets the gas inflow/outflow instruction Ig to 2 in S320, and ends the current execution of the gas leakage diagnosing process.

In the case where the CPU 191 determines in S300 that the value of the gas inflow/outflow instruction Ig is not 1, in S330, the CPU 191 determines whether or not the value of the first ammonia electromotive force change amount $\Delta$EMF1 is smaller than a second end determination value X3 set to be smaller than the first end determination value X2. The second end determination value X3 is a positive value. In the present embodiment, the second end determination value X3 is 7 mV.

In the case where the first ammonia electromotive force change amount ΔEMF1 is equal to or larger than the second end determination value X3, the CPU 191 ends the current execution of the gas leakage diagnosing process. Meanwhile, in the case where the first ammonia electromotive force change amount ΔEMF1 is smaller than the second end determination value X3, the CPU 191 proceeds to S270.

Figure 6:
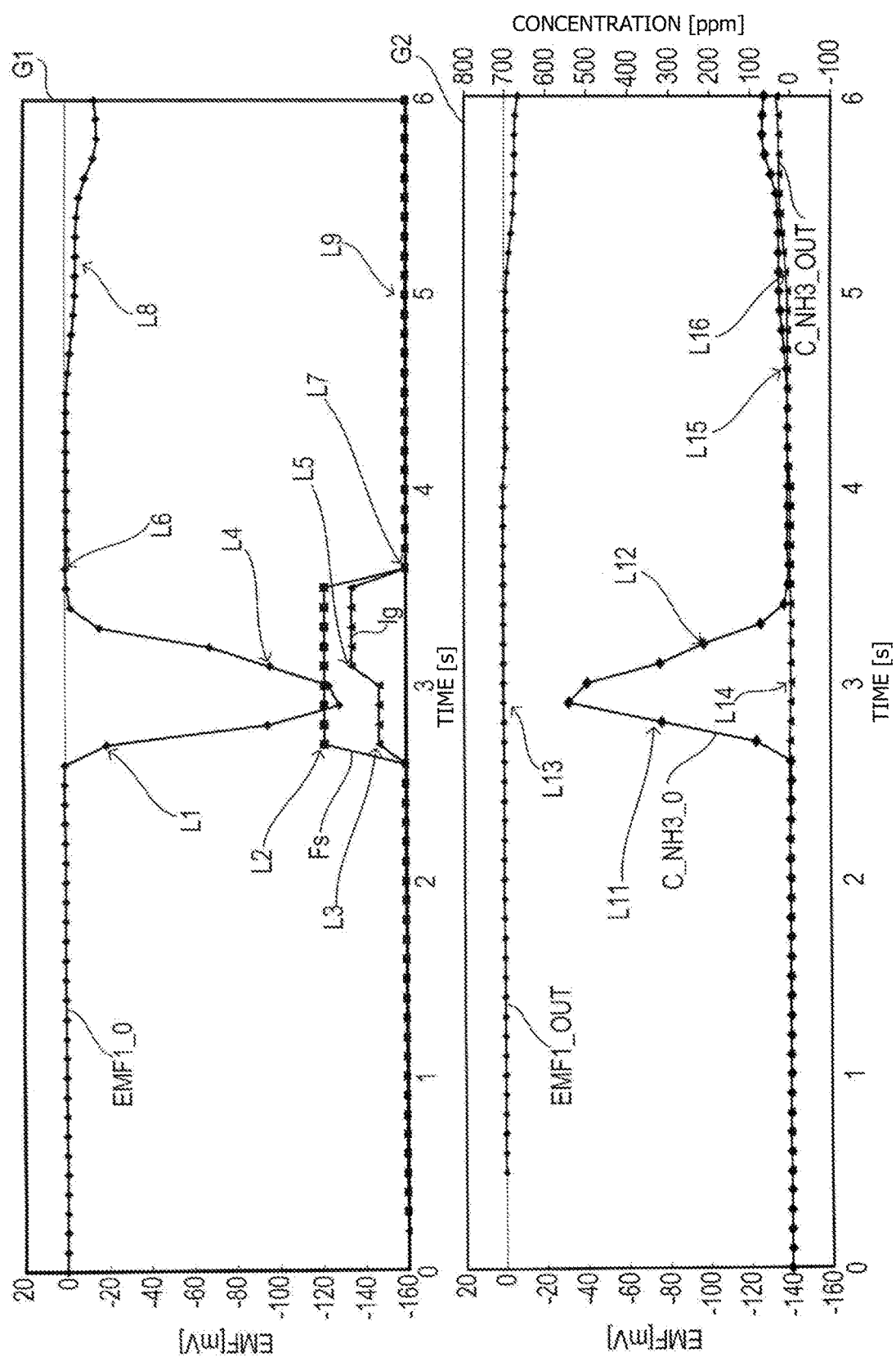
FIG. 6 indicates graphs showing changes in EMF1_0, Fs, Ig, EMF1_OUT, C_NH3_OUT, and C_NH3_0 with time.

Graph G1 of FIG. 6 shows time-course changes (changes with time) in the current first ammonia electromotive force EMF1_0, the rich spike flag Fs, and the gas inflow/outflow instruction Ig. Graph G2 of FIG. 6 shows time-course changes (changes with time) in the output first ammonia electromotive force EMF1_OUT, the ammonia concentration C_NH3_OUT computed on the basis of the output first ammonia electromotive force EMF1_OUT, and the ammonia concentration C_NH3_0 computed on the basis of the current first ammonia electromotive force EMF1_0.

As indicated by an arrow L1 in graph G1, at 2.7 sec, the current first ammonia electromotive force EMF1_0 sharply decreases due to a rich spike. As a result, the first ammonia electromotive force change amount ΔEMF1 becomes smaller than the value obtained by multiplying the start determination value X1 by −1. Therefore, as indicated by arrows L2 and L3 in graph G1, at 2.7 sec, the rich spike flag Fs is set, and the gas inflow/outflow instruction Ig is set to 1.

After that, as indicated by an arrow L4 in graph G1, at 3.1 sec, the current first ammonia electromotive force EMF1_0 increases sharply. As a result, the first ammonia electromotive force change amount ΔEMF1 becomes larger than the first end determination value X2. Therefore, as indicated by an arrow L5 in graph G1, at 3.1 sec, the gas inflow/outflow instruction Ig is set to 2.

Subsequently, as indicated by an arrow L6 in graph G1, at 3.6 sec, the first ammonia electromotive force change amount ΔEMF1 becomes smaller than the second end determination value X3. As a result, as indicated by an arrow L7 in graph G1, at 3.6 sec, the rich spike flag Fs is cleared, and the gas inflow/outflow instruction Ig is set to 0.

Notably, as indicated by an arrow L8 in graph G1, a decrease in the current first ammonia electromotive force EMF1_0 after 4.6 sec is gentle. Therefore, as indicated by an arrow L9 in graph G1, the rich spike flag Fs is not set after 4.6 sec.

Also, as a result of a sharp decrease in the current first ammonia electromotive force EMF1_0 during the period between 2.6 sec and 2.9 sec, as indicated by an arrow L11 in graph G2, the ammonia concentration C_NH3_0 increases sharply during the period between 2.6 sec and 2.9 sec. Also, as a result of a sharp increase in the current first ammonia electromotive force EMF1_0 during the period between 2.9 sec and 3.5 sec, as indicated by an arrow L12 in graph G2, the ammonia concentration C_NH3_0 decreases sharply during the the period between 2.9 sec and 3.5 sec.

In contrast, as indicated by an arrow L13 in graph G2, the output first ammonia electromotive force EMF1_OUT changes hardly during a time span during which the current first ammonia electromotive force EMF1_0 changes sharply (namely, the period between 2.6 sec and 3.5 sec). Therefore, as indicated by an arrow L14 in graph G2, the ammonia concentration C_NH3_OUT changes hardly during the above-mentioned time span.

As indicated by an arrow L15 in graph G2, the value of the ammonia concentration C_NH3_0 starts to increase at 4.6 sec. As indicated by an arrow L16 in graph G2, the value of the ammonia concentration C_NH3_OUT starts to increase at 5.1 sec. Namely, the ammonia concentration C_NH3_OUT is output by delaying the ammonia concentration C_NH3_0 by 0.5 sec.

Figure 7:
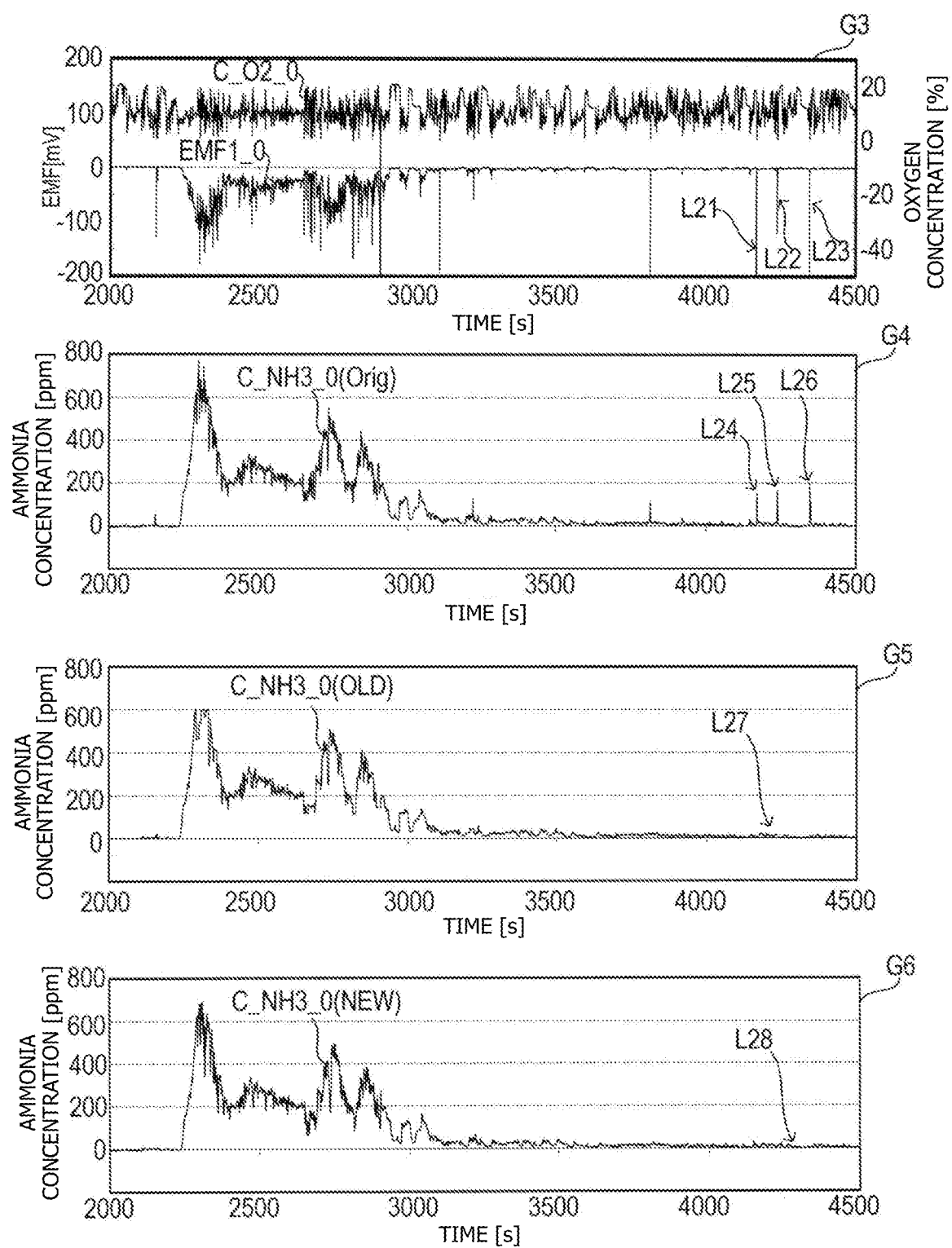
FIG. 7 indicates graphs showing changes in EMF1_0, C_O2_0, C_NH3_0(Orig), C_NH3_0(OLD), and C_NH3_0 (NEW) with time.

Graph G3 of FIG. 7 shows time-course changes (changes with time) in the current first ammonia electromotive force EMF1_0 and the current oxygen concentration C_O2_0. Graph G4 of FIG. 7 shows a time-course change (change with time) in the ammonia concentration C_NH3_0 computed on the basis of the current first ammonia electromotive force EMF1_0.

Graph G5 of FIG. 7 shows a time-course change (change with time) in the ammonia concentration C_NH3_0 for the case where the rich spike is detected by the method described in Japanese Unexamined Publication No. 2016-65862. Notably, in the method described in Japanese Unexamined Publication No. 2016-65862, the rich spike is detected on the basis of a change rate of the oxygen concentration.

Graph G6 of FIG. 7 shows a time-course change (change with time) in the ammonia concentration C_NH3_0 for the case where the rich spike is detected by the method of the present disclosure.

Notably, in the case where the rich spike is detected by the method described in Japanese Unexamined Publication No. 2016-65862 and the case where the rich spike is detected by the method of the present disclosure, the ammonia concentration C_NH3_0 is held at the last value.

In the following description, the ammonia concentration C_NH3_0 shown in graph G4 will be referred to as ammonia concentration C_NH3_0(Orig). The ammonia concentration C_NH3_0 shown in graph G5 will be referred to as ammonia concentration C_NH3_0(OLD). The ammonia concentration C_NH3_0 shown in graph G6 will be referred to as ammonia concentration C_NH3_0(NEW).

As indicated by arrows L21, L22, and L23 in graph G3, the current first ammonia electromotive force EMF1_0 sharply changes three times during a period of time between 4000 sec and 4500 sec. These sharp changes occur due to rich spikes.

Therefore, as indicated by arrows L24, L25, and L26 in graph G4, the ammonia concentration C_NH3_0(Orig) sharply changes three times during the period of time between 4000 sec and 4500 sec.

In contrast, as indicated by an arrow L27 in graph G5, in graph G5, the ammonia concentration C_NH3_0(OLD) does not change sharply during the period of time between 4000 sec and 4500 sec. Namely, graph G5 shows that rich spikes can be detected by the method described in Patent Document 1.

Similarly, as indicated by an arrow L28 in graph G6, in graph G6, the ammonia concentration C_NH3_0(NEW) does not change sharply during the period of time between 4000 sec and 4500 sec. Namely, graph G6 shows that rich spikes can be detected by the method of the present disclosure.

Figure 8:
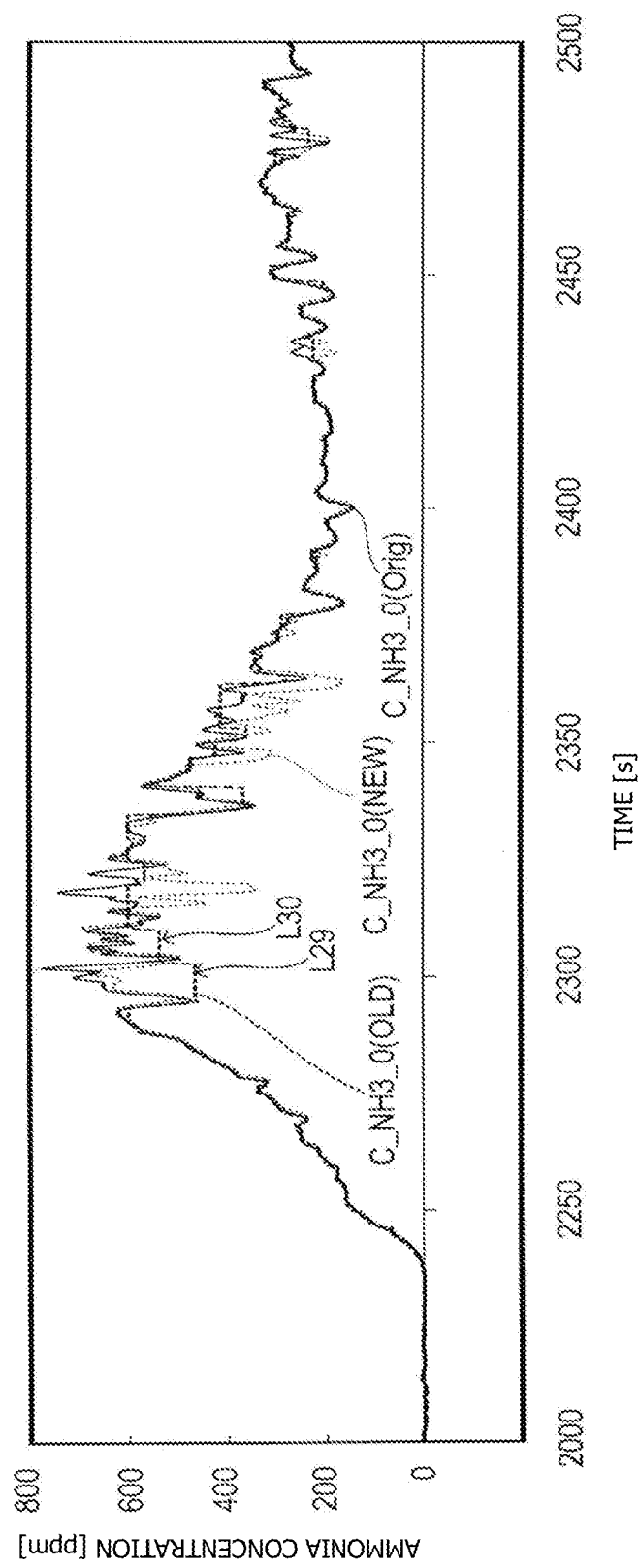
FIG. 8 is a graph showing changes in C_NH3_0(Orig), C_NH3_0(OLD), and C_NH3_0(NEW) with time during a period between 2000 sec and 2500 sec.

FIG. 8 is a graph showing time-course changes in the ammonia concentration C_NH3_0(Orig), the ammonia concentration C_NH3_0(OLD), and the ammonia concentration C_NH3_0(NEW) in graphs G4, G5, and G6 during a period between 2000 sec and 2500 sec.

Figure 9:
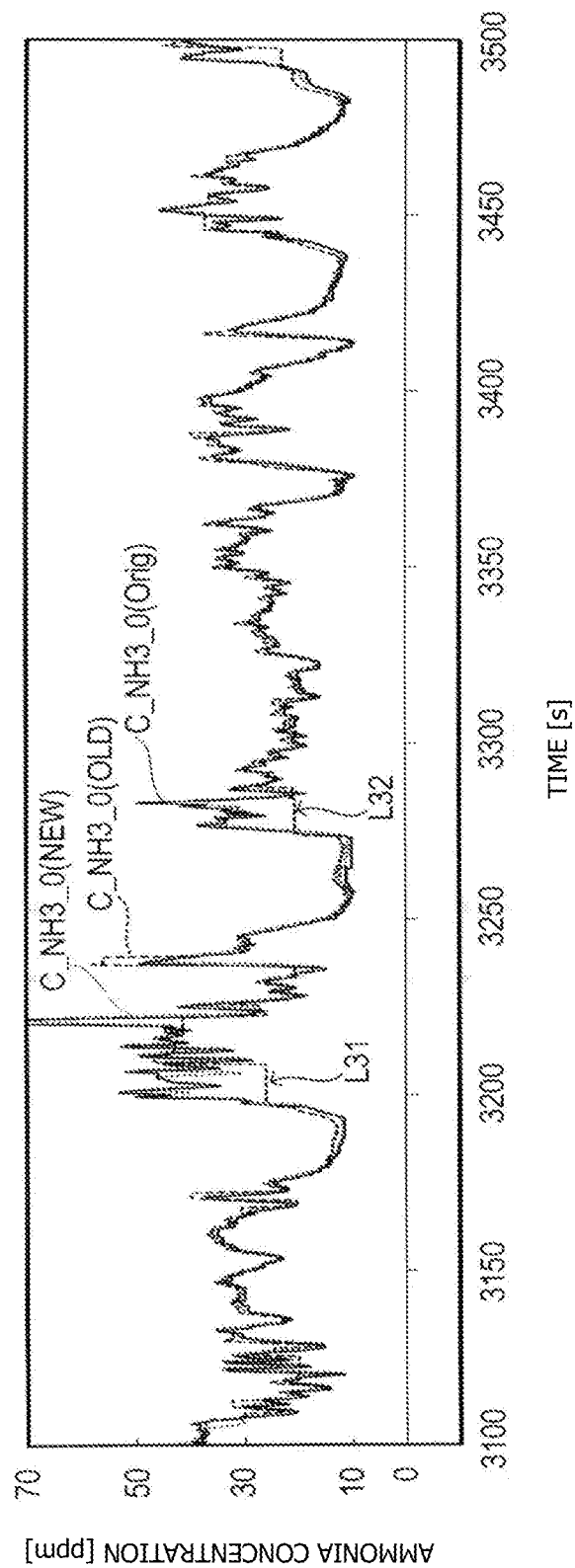
FIG. 9 is a graph showing changes in C_NH3_0(Orig), C_NH3_0(OLD), and C_NH3_0(NEW) with time during a period between 3100 sec and 3500 sec.

FIG. 9 is a graph showing time-course changes in the ammonia concentration C_NH3_0(Orig), the ammonia concentration C_NH3_0(OLD), and the ammonia concentration C_NH3_0(NEW) in graphs G4, G5, and G6 during a period between 3100 sec and 3500 sec.

For example, in some cases, whereas the ammonia concentration C_NH3_0(NEW) fluctuates as indicated by arrows L29 and L30 in FIG. 8 and arrows L31 and L32 in FIG. 9, the ammonia concentration C_NH3_0(OLD) keeps a constant value. This shows that the method described in Japanese Unexamined Publication No. 2016-65862 may detect a rich spike when it is not generated.

The microcomputer 190 configured as described above computes the concentration of ammonia contained in exhaust gas. The microcomputer 190 repeatedly obtains the first ammonia electromotive force EMF1 which is output from the first ammonia detection section 102 and whose value changes with both the concentrations of ammonia and a flammable gas contained in the exhaust gas. The microcomputer 190 stores the current first ammonia electromotive force EMF1_0, the one-cycle-ago first ammonia electromotive force EMF1_1, the two-cycles-ago first ammonia electromotive force EMF1_2, the three-cycles-ago first ammonia electromotive force EMF1_3, the four-cycles-ago first ammonia electromotive force EMF1_4, and the five-cycles-ago first ammonia electromotive force EMF1_5 each of which represents the obtained first ammonia electromotive force EMF1.

Through use of the current first ammonia electromotive force EMF1_0, the one-cycle-ago first ammonia electromotive force EMF1_1, the two-cycles-ago first ammonia electromotive force EMF1_2, the three-cycles-ago first ammonia electromotive force EMF1_3, the four-cycles-ago first ammonia electromotive force EMF1_4, and the five-cycles-ago first ammonia electromotive force EMF1_5 which are stored, the microcomputer 190 outputs ammonia concentration information representing the ammonia concentration at the point in time 0.5 sec prior to the present point in time, as ammonia concentration information at the present point in time.

The microcomputer 190 sets the rich spike flag Fs in the case where the first ammonia electromotive force change amount $\Delta$EMF1 is smaller than the value obtained by multiplying the start determination value X1 by −1.

In the case where the rich spike flag Fs is set, the microcomputer 190 sets the ammonia concentration information at the present point in time, which is to be output, to the value of the ammonia concentration information immediately before the rich spike flag Fs is set.

As described above, the microcomputer 190 determines whether or not the flammable gas is contained in the exhaust gas on the basis of the first ammonia electromotive force EMF1 the value of which changes not only with the concentration of ammonia but also with the concentration of the flammable gas. When a rich spike is generated, the concentration of the flammable gas contained in the exhaust gas increases sharply. In view of this, the microcomputer 190 sets the rich spike flag Fs in the case where the first ammonia electromotive force change amount $\Delta$EMF1 is smaller than the value obtained by multiplying the start determination value X1 by −1. Namely, the microcomputer 190 can detect a rich spike in which the flammable gas concentration increases sharply. Therefore, the microcomputer 190 can detect such a rich spike on the basis of the flammable gas concentration rather than the oxygen concentration, thereby improving the rich spike detection accuracy.

Also, the microcomputer 190 outputs, as the ammonia concentration information at the present point in time, the ammonia concentration information representing the ammonia concentration at the point 0.5 sec prior to the present point in time. In the case where the microcomputer 190 determines that the flammable gas is contained in the gas under measurement, the microcomputer 190 sets the ammonia concentration information at the present point in time as the value of the ammonia concentration information immediately before the microcomputer 190 determines that the flammable gas is contained in the gas under measurement. In other words, in the case where the microcomputer 190 determines that the flammable gas is contained in the gas under measurement, the microcomputer 190 outputs the value of the ammonia concentration information immediately before the microcomputer 190 determines that the flammable gas is contained in the gas under measurement as the ammonia concentration information at the present point. As a result, the microcomputer 190 can prevent occurrence of a situation where, due to an increase in the flammable gas concentration caused by the generation of a rich spike, the value of the ammonia concentration information increases despite that the ammonia concentration does not change. Thus, the microcomputer 190 can prevent a deterioration in the accuracy in detecting the ammonia concentration.

Also, the microcomputer 190 clears the rich spike flag Fs when the first ammonia electromotive force change amount $\Delta$EMF1 becomes smaller than the second end determination value X3 after having become larger than the first end determination value X2 set in advance. Namely, the microcomputer 190 uses, as one of the conditions for clearing the rich spike flag Fs, the state in which the first ammonia electromotive force change amount $\Delta$EMF1 is larger than the first end determination value X2.

As a result, the microcomputer 190 can determine whether or not a rich spike has ended on the basis of the characteristics of the rich spike that the rich spike ends after the flammable gas concentration decreases sharply after having increased sharply. Thus, the microcomputer 190 can accurately determine the end of the rich spike.

In the above-described embodiment, the microcomputer 190 corresponds to the concentration computation apparatus in the claims; S10 and S60 correspond to the process performed by the storage section in the claims; S100 and S110 correspond to the process performed by the concentration output section in the claims; S20 corresponds to the process performed by the flammable gas determination section in the claims; S70 and S80 correspond to the process performed by the information setting section in the claims; and S270, S280, and S300 to S330 correspond to the process performed by the electromotive force end determination section in the claims.

The exhaust gas corresponds to the gas under measurement in the claims; the first ammonia electromotive force EMF1 corresponds to the ammonia electromotive force in the claims; and the first ammonia detection section 102 corresponds to the ammonia detection section in the claims.

The current first ammonia electromotive force EMF1_0, the one-cycle-ago first ammonia electromotive force EMF1_1, the two-cycles-ago first ammonia electromotive force EMF1_2, the three-cycles-ago first ammonia electromotive force EMF1_3, the four-cycles-ago first ammonia electromotive force EMF1_4, and the five-cycles-ago first ammonia electromotive force EMF1_5 correspond to the ammonia electromotive force information in the claims.

The ammonia concentration information sent in S110 corresponds to the delayed ammonia concentration information and the current ammonia concentration information in the claims. 0.5 sec corresponds to the delay time in the claims; 0.2 sec corresponds to the decreased time interval in the claims; the first ammonia electromotive force change amount $\Delta$EMF1 corresponds to the amount of decrease in the ammonia electromotive force in the claims; and the start determination value X1 corresponds to the start determination value in the claims.

The determination conditions of S300 and S330 correspond to the electromotive force end conditions in the claims; 0.2 sec corresponds to the ammonia increase time interval in the claims; the first ammonia electromotive force change amount $\Delta EMF1$ corresponds to the amount of increase in the ammonia electromotive force in the claims; and the first end determination value X2 corresponds to the ammonia end determination value in the claims.

Second Embodiment

Next, a second embodiment of the present disclosure will be described with reference to the drawings. Notably, in the second embodiment, portions different from those of the first embodiment will be described. The components and portions common between the first and second embodiments are denoted by the same reference numerals.

A multi-gas detection apparatus of the second embodiment differs from the multi-gas detection apparatus of the first embodiment in that a modified gas leakage diagnosing process is performed in the second embodiment.

Figure 10:
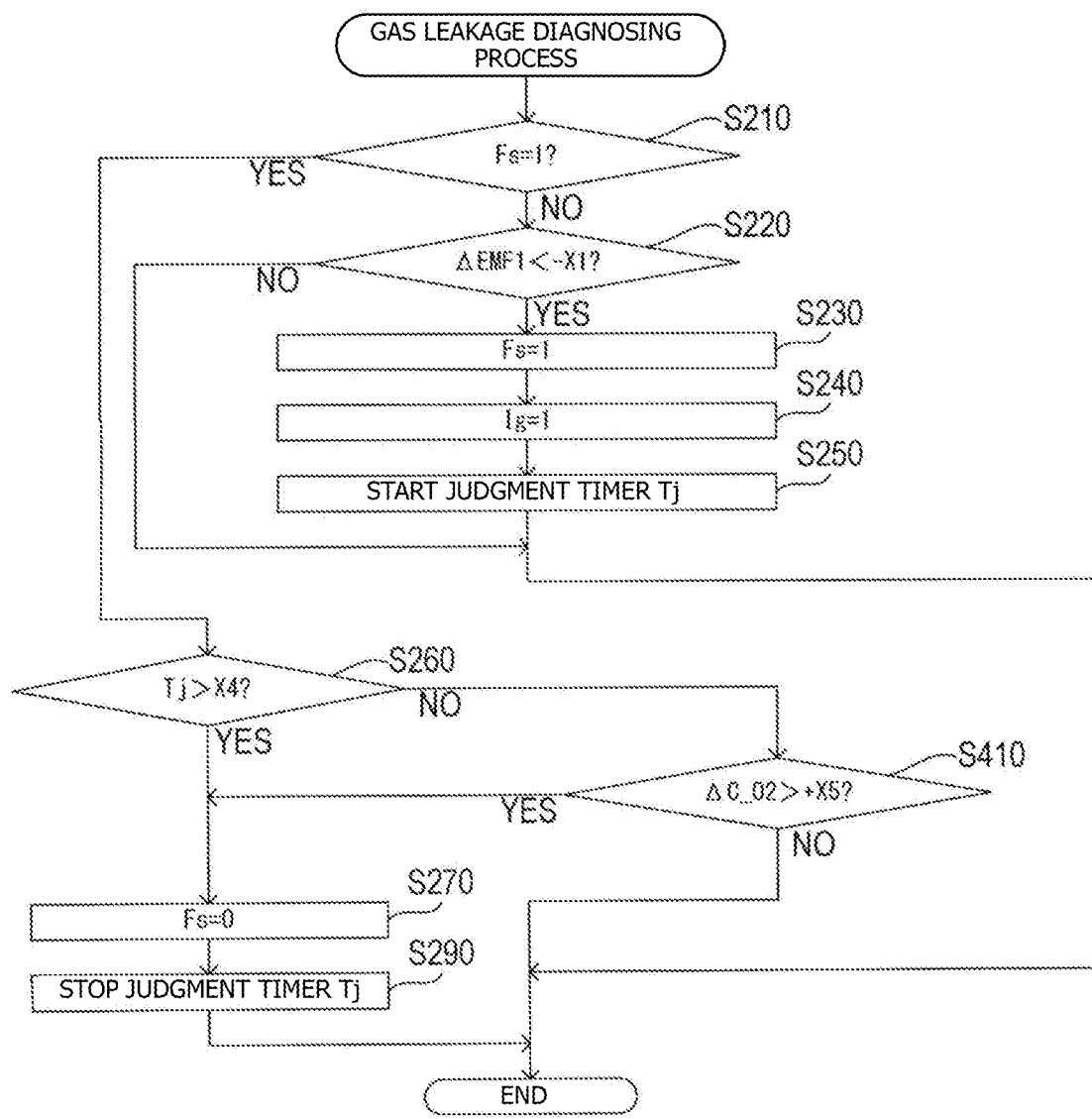
FIG. 10 is a flowchart showing a gas leakage diagnosing process according to a second embodiment.

As shown in FIG. 10, the gas leakage diagnosing process of the second embodiment differs from the gas leakage diagnosing process of the first embodiment in that the processing of S410 is executed in place of the processing of S280 and S300 to S330.

Namely, in the case where the CPU 191 of the microcomputer 190 determines in S260 that the value of the judgment timer Tj is equal to or smaller than the continuation determination value X4, the CPU 191 determines in S410 whether or not the oxygen concentration change amount $\Delta C\_O2$ is larger than a third end determination value X5 set in advance. The third end determination value X5 is a positive value.

In the case where the oxygen concentration change amount $\Delta C\_O2$ is equal to or smaller than the third end determination value X5, the CPU 191 ends the current execution of the gas leakage diagnosing process. Meanwhile, in the case where the oxygen concentration change amount $\Delta C\_O2$ is larger than the third end determination value X5, the CPU 191 proceeds to S270.

After completion of the processing of S270, the CPU 191 proceeds to S290.

The microcomputer 190 configured as described above repeatedly obtains the first pumping current Ip1 which is output from the NOx detection section 101 and whose value changes with the concentration of oxygen contained in the exhaust gas. The microcomputer 190 computes, as the calculated oxygen concentration C_O2_CAL, the concentration of oxygen contained in the exhaust gas on the basis of the obtained first pumping current Ip1.

The microcomputer 190 clears the rich spike flag Fs in the case where the oxygen concentration change amount $\Delta C\_O2$ is larger than the third end determination value X5 set in advance. Namely, the microcomputer 190 uses, as one of the conditions for clearing the rich spike flag Fs, the state in which the oxygen concentration change amount $\Delta C\_O2$ is larger than the third end determination value X5.

As a result, the microcomputer 190 can determine whether or not a rich spike has ended on the basis of the characteristics of the rich spike that the rich spike ends after the oxygen concentration increases sharply. Thus, the microcomputer 190 can accurately determine the end of the rich spike.

In the above-described embodiment, S10 and S30 correspond to the process performed by the oxygen concentration computation section in the claims; and S410 corresponds to the process performed by the oxygen end determination section in the claims.

The first pumping current Ip1 corresponds to the oxygen concentration signal in the claims; the NOx detection section 101 corresponds to the oxygen detection section in the claims; and the calculated oxygen concentration C_O2_CAL corresponds to the calculated oxygen concentration in the claims.

The determination conditions of S410 correspond to the oxygen end conditions in the claims; 0.2 sec corresponds to the oxygen increase time interval in the claims; the oxygen concentration change amount $\Delta C\_O2$ corresponds to the amount of increase in the calculated oxygen concentration in the claims; and the third end determination value X5 corresponds to the oxygen end determination value in the claims.

While embodiments of the present disclosure have been described, the present disclosure is not limited to the embodiments. The present disclosure can be implemented in various forms.

For example, in the above embodiments, pieces of information representing the ammonia concentration, the $NO_2$ concentration, and the NOx concentration calculated through use of the first pumping current Ip1, the second pumping current Ip2, the first ammonia electromotive force EMF1, and the second ammonia electromotive force EMF2 obtained five cycles ago are sent to the electronic controller 200. Namely, in the above-described embodiments, pieces of information representing the ammonia concentration, the $NO_2$ concentration, and the NOx concentration at the point 0.5 sec prior to the present point in time are sent to the electronic controller 200. However, the pieces of information representing the ammonia concentration, the $NO_2$ concentration, and the NOx concentration at the point which is prior to the present point in time by the preset delay time are not limited thereto. For example, the embodiments may be modified to send, as concentration information at the point which is prior to the present point in time by the preset delay time, the average of concentrations within a predetermined time range including the point which is prior to the present point in time by the delay time. Specifically, the average of the ammonia concentrations at points which are 0.5 sec, 0.6 sec, and 0.7 sec prior to the present point in time may be sent as the ammonia concentration information at the point 0.5 sec prior to the present point in time.

In the above-described embodiments, the rich spike flag Fs is cleared when the first ammonia electromotive force change amount $\Delta EMF1$ becomes smaller than the second end determination value X3 after having become larger than the first end determination value X2 set in advance. However, the embodiments may be modified such that the rich spike flag Fs is cleared when the first ammonia electromotive force change amount $\Delta EMF1$ becomes larger than the first end determination value X2 set in advance.

The function of a single component in the above-described embodiments may be allotted to a plurality of components, or the functions of a plurality of components may be realized by a single component. Part of the configuration of each of the above-described embodiments may be omitted. At least part of the configuration of each of the above-described embodiments may be added to the configuration of another embodiment or may replace the configuration of another embodiment. All embodiments included in the technical ideas specified by the wording of the claims are embodiments of the present disclosure.

The present disclosure may be implemented in various forms other than the microcomputer 190. Specifically, the present disclosure may be implemented as a system including the microcomputer 190 as a component, a program that causes a computer to function as the microcomputer 190, a non-transitory tangible recording medium, e.g., a semiconductor memory, in which the program is stored, and a concentration computation method.

DESCRIPTION OF REFERENCE NUMERALS

2 . . . multi-gas sensor, 3 . . . control section, 102 . . . first ammonia detection section, 190 . . . microcomputer.

The invention claimed is:

1. A concentration computation apparatus for computing the concentration of ammonia contained in a target gas, said concentration computation apparatus comprising:
a memory storage device configured to repeatedly receive an ammonia electromotive force which is output from a sensor element wherein a value of the ammonia electromotive force changes with both the concentration of ammonia contained in the target gas and the concentration of a flammable gas contained in the target gas and to store information about the value of the ammonia electromotive force representing the received ammonia electromotive force; and
a CPU configured to use the ammonia electromotive force information stored in the memory storage device to output delayed ammonia concentration information as current ammonia concentration information, said delayed ammonia concentration information representing the ammonia concentration at a point prior to a present point in time by a preset delay time, wherein
the CPU is configured to determine that the flammable gas is contained in the target gas in the case where an amount of decrease in the ammonia electromotive force in a decreased time interval set to be shorter than the delay time is larger than a start determination value set in advance,
the CPU is configured to set the current ammonia concentration information using a value of the delayed ammonia concentration information, and
when the CPU determines that the flammable gas is contained in the target gas, the value of the delayed ammonia concentration information observed immediately before the determination is set as the current ammonia concentration information.

2. The concentration computation apparatus according to claim 1, wherein
the CPU is configured to determine whether or not electromotive force end conditions are satisfied, the electromotive force end conditions being set in advance through use of the ammonia electromotive force so as to determine that the flammable gas is not contained in the target gas, and to determine that the flammable gas is not contained in the target gas when the electromotive force end conditions are satisfied, and
the electromotive force end conditions include at least one condition in which an amount of increase in the ammonia electromotive force in an ammonia increase time interval set in advance is larger than an ammonia end determination value set in advance.

3. The concentration computation apparatus according to claim 1, wherein,
the CPU is configured to repeatedly obtain an oxygen concentration signal which is output from the sensor element and whose value changes with the concentration of oxygen contained in the target gas and to compute, as a calculated oxygen concentration, the concentration of oxygen contained in the target gas on the basis of the obtained oxygen concentration signal,
the CPU is configured to determine whether or not oxygen end conditions are satisfied, the oxygen end conditions being set in advance through use of the calculated oxygen concentration so as to determine that the flammable gas is not contained in the target gas, and to determine that the flammable gas is not contained in the target gas when the oxygen end conditions are satisfied, and
the oxygen end conditions include at least one condition in which an amount of increase in the calculated oxygen concentration in an oxygen increase time interval set in advance is larger than an oxygen end determination value set in advance.

4. The concentration computation apparatus according to claim 1, wherein the value of the delayed ammonia concentration information observed 0.5 seconds before the determination is set as the current ammonia concentration information.

* * * * *